United States Patent
Simmons et al.

(10) Patent No.: US 12,478,912 B2
(45) Date of Patent: *Nov. 25, 2025

(54) FILTER CLEANING SYSTEM FOR USE WITH AN EXTERNAL MOUNTED FILTER ASSEMBLY INCLUDING TIMER ACTIVATED FUNCTIONALITY

(71) Applicant: The Newway Company, Inc., Commerce Township, MI (US)

(72) Inventors: Jesse Kenneth Simmons, Commerce Township, MI (US); Randy Simmons, West Chester, OH (US); Brian Ross Simmons, White Lake, MI (US)

(73) Assignee: Simmons Holding Company, LLC., Commerce Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,174

(22) Filed: Apr. 15, 2024

(65) Prior Publication Data
US 2024/0261717 A1    Aug. 8, 2024

Related U.S. Application Data

(63) Continuation-in-part of application No. 17/897,636, filed on Aug. 29, 2022, now Pat. No. 12,350,616.
(Continued)

(51) Int. Cl.
*B01D 46/682* (2022.01)
*B01D 46/42* (2006.01)
(Continued)

(52) U.S. Cl.
CPC .......... *B01D 46/682* (2022.01); *B01D 46/42* (2013.01); *B01D 46/71* (2022.01); *B01D 46/79* (2022.01);
(Continued)

(58) Field of Classification Search
CPC ...... B01D 46/682; B01D 46/42; B01D 46/71; B01D 46/79; B01D 46/4227; B01D 46/66;
(Continued)

(56) References Cited

U.S. PATENT DOCUMENTS 3,958,296 A * 5/1976 Fell ........................ B01D 41/04
                                                                15/304
4,153,431 A    5/1979 Higgins
(Continued)

FOREIGN PATENT DOCUMENTS

CN    204478332 U    7/2015
CN     21290274 U    4/2021
(Continued)

OTHER PUBLICATIONS

KR 101200480 translation obtained from Espacenet on Apr. 24, 2025 (Year: 2025).*

*Primary Examiner* — In Suk C Bullock
*Assistant Examiner* — Jessica M Whitman
(74) *Attorney, Agent, or Firm* — Dinsmore & Shohl LLP

(57) ABSTRACT

A system for cleaning a filter mounted over an intake opening of an air handling unit. A conduit is secured to an elevated location of the unit and includes a plurality of spaced nozzles arrayed against the filter. A supply tube connects to the conduit for supplying a pressurized fluid through the nozzles in order to clear debris from an exterior of the mounted filter. The pressurized fluid includes either of a liquid (typically water) or a compressed air provided from any of a source or a supply reservoir. A pump is incorporated into the supply tube for pressurizing the fluid. A filter incorporated into the supply tube filters the pressurized fluid prior to delivery to spray issuing conduit. A processor/controller is provided in combination with an arrangement of control valves for providing timed sequenced washing of (Continued)

the filters. A collection basin is provided for recycling used liquid for re-delivery and re-use through the spray delivery conduits.

17 Claims, 24 Drawing Sheets

Related U.S. Application Data

(60) Provisional application No. 63/347,084, filed on May 31, 2022.

(51) Int. Cl.
| | | |
|---|---|---|
| *B01D 46/66* | (2022.01) | |
| *B01D 46/71* | (2022.01) | |
| *B01D 46/79* | (2022.01) | |
| *B01D 47/06* | (2006.01) | |
| B01D 46/68 | (2022.01) | |
| B01D 46/69 | (2022.01) | |
| B01D 46/70 | (2022.01) | |
| B01D 46/72 | (2022.01) | |

(52) U.S. Cl.
CPC .......... *B01D 46/4227* (2013.01); *B01D 46/66* (2022.01); *B01D 46/68* (2022.01); *B01D 46/69* (2022.01); *B01D 46/70* (2022.01); *B01D 46/715* (2022.01); *B01D 46/72* (2022.01); *B01D 47/06* (2013.01)

(58) Field of Classification Search
CPC ........ B01D 46/68; B01D 46/69; B01D 46/70; B01D 46/715; B01D 46/72; B01D 47/06
See application file for complete search history.

(56) References Cited

U.S. PATENT DOCUMENTS

| | | | |
|---|---|---|---|
| 4,157,251 A * | 6/1979 | Colomer | B01D 46/10 |
| | | | 96/229 |
| 5,117,644 A | 6/1992 | Fought | |
| 5,282,575 A * | 2/1994 | Krulick | B05B 13/0415 |
| | | | 239/263.1 |
| 5,370,722 A | 12/1994 | Simomns | |
| 5,593,585 A * | 1/1997 | Groetzinger | B01D 29/6438 |
| | | | 210/389 |
| 7,775,221 B2 | 8/2010 | Zeile | |
| 8,359,875 B2 | 1/2013 | Matracea et al. | |
| 8,950,205 B2 | 2/2015 | Matracea et al. | |
| 9,770,684 B1 * | 9/2017 | Kelyman | B01D 46/26 |
| 9,943,786 B2 | 4/2018 | Ekholm et al. | |
| 10,365,053 B2 | 7/2019 | Billings | |
| 10,894,274 B1 | 1/2021 | Al-Shayea et al. | |
| 2003/0213253 A1 | 11/2003 | James | |
| 2005/0279064 A1 | 12/2005 | Simmons | |
| 2010/0229586 A1 | 9/2010 | Nicodem | |
| 2012/0024321 A1 | 2/2012 | Hays | |
| 2013/0206706 A1 | 8/2013 | Ekholm et al. | |
| 2019/0239489 A1 | 8/2019 | Roche | |
| 2020/0222845 A1 | 7/2020 | Simmons | |
| 2020/0348082 A1 | 11/2020 | Ly | |
| 2020/0406182 A1 | 12/2020 | Grieve | |
| 2021/0146289 A1 * | 5/2021 | Langston | B01D 46/04 |
| 2021/0402338 A1 | 12/2021 | Lind | |
| 2023/0152050 A1 | 5/2023 | Stewart | |
| 2023/0417498 A1 | 12/2023 | Dwight et al. | |
| 2024/0053054 A1 | 2/2024 | Nam et al. | |

FOREIGN PATENT DOCUMENTS

| | | |
|---|---|---|
| CN | 113137679 A | 7/2021 |
| CN | 216245814 U | 4/2022 |
| CN | 115180743 B | 4/2023 |
| KR | 101200480 B1 * | 11/2012 |

* cited by examiner

FILTER CLEANING SYSTEM FOR USE WITH AN EXTERNAL MOUNTED FILTER ASSEMBLY INCLUDING TIMER ACTIVATED FUNCTIONALITY

CROSS REFERENCE TO RELATED APPLICATIONS

The present application is a continuation in part of U.S. Ser. No. 17/897,636 filed Aug. 29, 2022. The '636 application claims the priority of U.S. Ser. No. 63/347,084 filed May 31, 2022.

FIELD OF THE INVENTION

The present invention relates generally to cleaning of external mounted filters, such as which may without limitation be mounted over an intake opening of an external cooling tower. More specifically, the present invention discloses improvements in the construction of filter cleaning systems which include the use of timer functionality, control valves and dedicated zones for cleaning the filters. Other variants incorporate the use of fluid collection troughs or reservoirs, along with fluid filtration, resupply piping and makeup water supply for providing green options for the filter wash assembly.

BACKGROUND OF THE INVENTION

Traditionally, cottonwood filter screens installed over intake openings on mechanical air movement systems prevent airborne debris from entering. Such mechanical air movement systems can include cooling towers, wall louvers, rooftop units, chillers, air handling units and more. When the filters are loaded and in need of cleaning, traditional methods for cleaning include manually sweeping with a broom, or blowing off with a leaf blower, spraying with garden hose or using a shop vacuum.

The prior art also teaches pulley style assemblies for raising and lowering a filter screen associated with an outdoor located air handling unit. A representative example of this is shown in U.S. Pat. No. 5,370,722 to Simmons.

Other prior art references disclose the incorporation of channels or tracks for securing to the intake structure and between which the filter is supported by traversable rollers supported within the channels for raising and lowering the filter. Examples of these include US 2020/0222845 and US 2005/0279064, both to Simmons.

SUMMARY OF THE INVENTION

The present invention discloses a system and assembly for efficiently cleaning external mounted filters, such as without limitation associated with cooling tower applications, and without having to first demount or remove the filter. In a first application, a fluid supply conduit with spaced apart spray wash nozzles secures to the intake structure above the intake opening, with the nozzles angled, typically downwardly, relative to an upper edge of the filter mounted over the intake opening. A fluid supply tube is connected to the spray conduit and can include such as a pressurized water supply provided from a source and/or a supply reservoir with a pump for delivering fluid under adequate pressure for issuing through the spray nozzles.

The spray nozzles are optimally directed at a downward angle (can be fixed or adjustable) relative to the upper horizontal edge of the filter and, upon activation, resulting in a cascading curtain of water for progressively clearing aggregated impediments (such as cottonwood seed, insects, and other airborne debris) from the exterior surface of the filter. In a further application, the fluid supply tube can include a separate supply attachment for feeding a hand-held power washer.

Other variants include providing multiple fixed tiers of spray applying conduit, such as associated with taller filter installations in which a single upper tier is inadequate for effectively clearing the filter exterior. Alternatively, a single horizontal tier of fluid supply tube with spaced apart nozzles can be incorporated into any of a traversable pulley or channel track mounted configuration for being progressively translated (i.e. including vertical raising and lower as well as being horizontally advanced across the intake opening) this again concurrent with clearing the exterior surface of the filter screen.

Additional variants can include substituting the water spray conduit with pneumatic or air supply tube with air nozzles for issuing a high-pressure airflow in order to clear the exterior of the mounted filter. This can further include connecting a high-pressure compressor to the fluid conduit in order to distribute the pressurized air through the nozzles and against the exterior surface of the filter screen.

Other variants include vertically suspending a single spray tube from an upper horizontally mounted track for traversing widthwise by an individual at ground level. The assembly according to this variant can be adapted for traversing widthwise across multiple cells or intake openings associated with a single cooling tower structure.

Yet additional variants include improvements in the construction of filter cleaning systems which include the use of timer functionality, control valves and dedicated zones for cleaning the filters. Other variants incorporate the use of fluid recovery troughs or reservoirs, along with in-line or secondary fluid filtration and piping for adding to the cooling tower makeup water supply for providing green options for the filter wash assembly.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a system or assembly for efficiently cleaning or clearing (such terms as wash, clean, and clear are understood to be interchangeably used) external mounted filters of filter screens, such as without limitation associated with cooling tower applications, and without having to first demount or remove the filter. Additionally, the presently assembly can be utilized in any of a single intake or multiple intake application associated with any installation. As will be described with further reference to the several illustrations, a PVC or other piping structure is provided and which is configured with at least one slot or an array of downwardly oriented nozzles or orifices.

Figure 1:
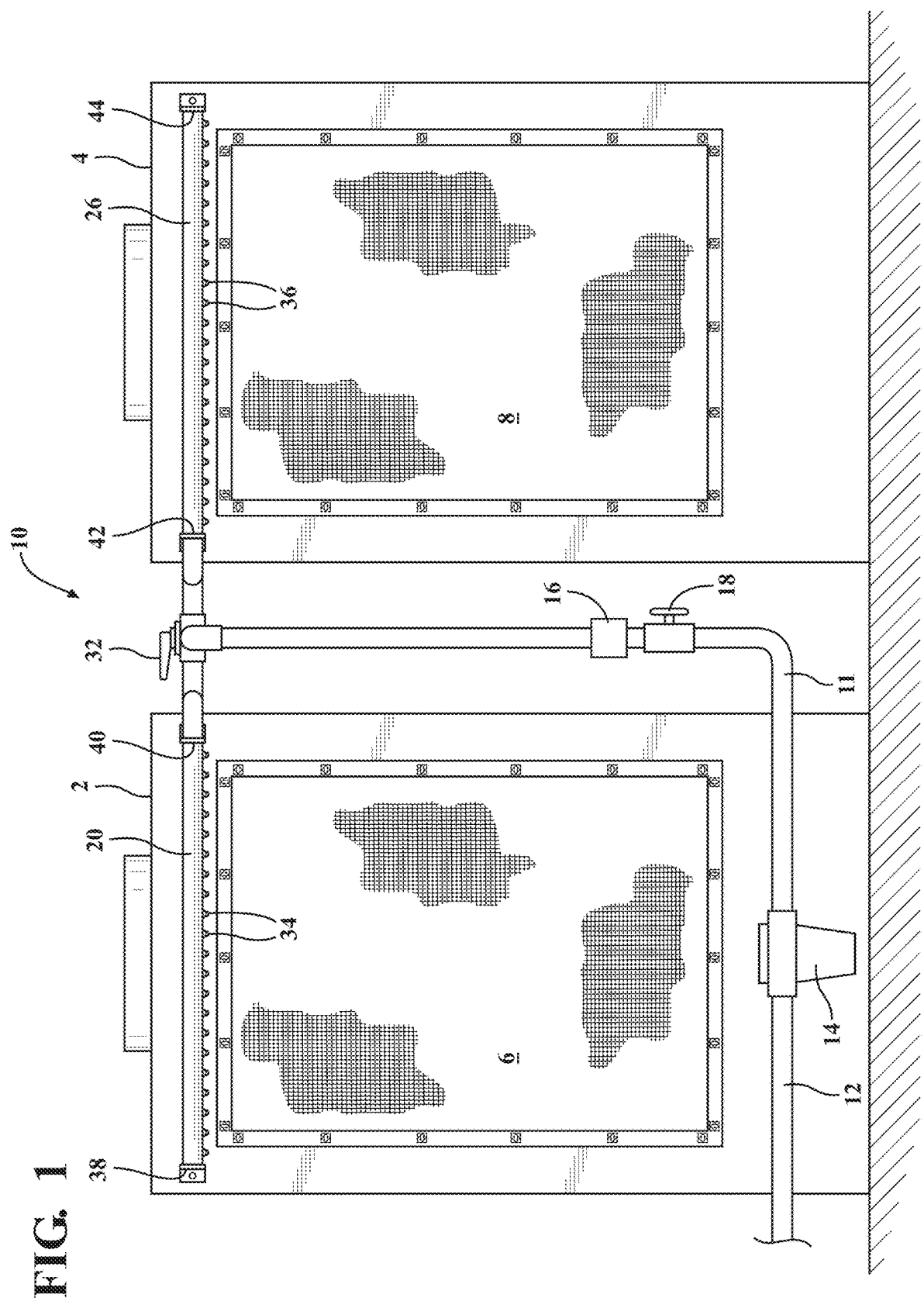
FIG. 1 is an environmental illustration of a filter wash assembly incorporating an elevated fluid spray conduit secured to such as an exterior cooling tower according to one non-limiting embodiment of the present invention.

Referring to FIG. 1 an environmental illustration is generally shown at 10 of a filter cleaning assembly incorporating an elevated fluid spray conduit 12 secured to such as an exterior located air intake structure. This is shown as a pair of such air intake units or structures, such as including without limitation cooling towers 2 and 4, arranged in side-by-side fashion and according to one non-limiting embodiment of the present invention. As will be described in reference to succeeding embodiments, the individual air intake structures can each include at least one opening.

A main fluid supply line 12 is depicted, such as which can extend from a remote pressurized water source. Without limitation, a pump 14 can be incorporated into the supply line 12 in the event a suitable output pressure is required, with a suitable filter 16 incorporated into the supply line 12 for removing any contaminants from the water supply. An on/off valve 18 is provided for activating the fluid supply.

Figure 2:
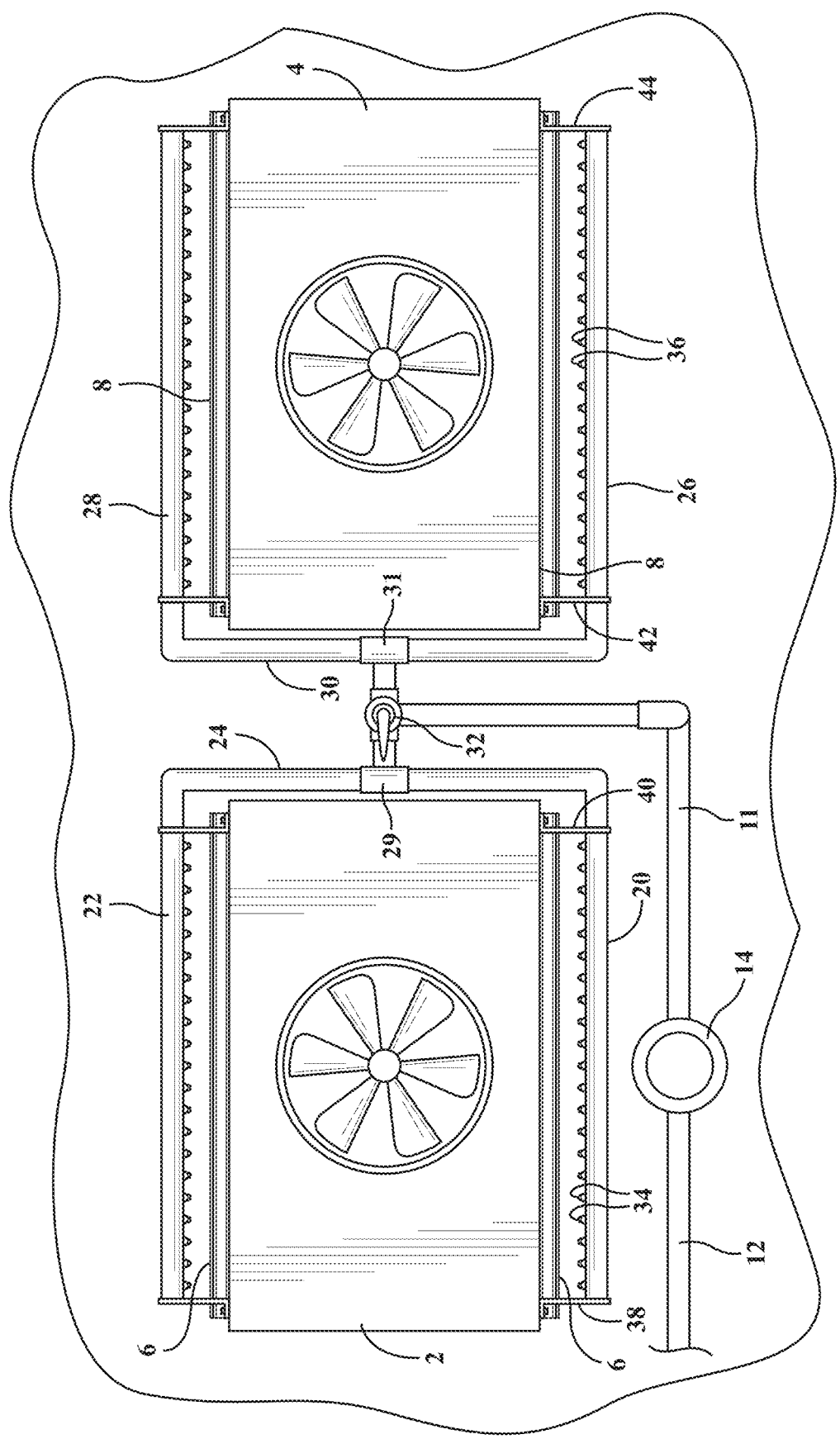
FIG. 2 is an overhead view of the assembly of FIG. 1 and depicting fluid spray issuing conduits located upon each of opposite faces of a pair of cooling towers.

FIG. 2 depicts is an overhead view of the assembly of FIG. 1 and shows each of individual fluid spray issuing conduits located upon each of opposite air intake faces of the pair of cooling towers 2 and 4. The piping network includes a pair of "U" shaped piping structures for each of the cooling towers 2/4 and including a first pair of spaced apart fluid spray conduits 20 and 22 fed by a common take-off conduit 24 for the first tower or intake structure 2 and a second pair of spray conduits 26/28 fed by a common take-off conduit 30 for the second intake structure 4. Also shown are "T" fittings 29 and 31 incorporated into the common feeder or supply conduits for supplying the pairs 20/22 and 26/28 of fluid spray conduits.

Also shown is a directional valve 32 located at a common feeder or supply input location between the individual fluid spray networks and the main fluid supply line 12, such as which can be manually or remotely adjusted in order to alternatively direct the pressurized fluid spray through pluralities of nozzles associated with each of the overhead mounted spray applicating conduits (see for example spray nozzles as shown at 34 for selected conduit 20 and 36 for further selected conduit 26). Each of the spray conduits are fixedly mounted in the illustrated variant at locations proximate an upper horizontal edge of a filter screens (see as shown by pairs of screens 6 and 8 for intake structures 2 and 4), in the illustrated instance utilizing supporting "L" brackets as exemplary shown at 38 and 40 for selected spray conduit 20 and further at 42 and 44 for further selected spray conduit 26.

As will be additionally described, either or both of the on/off valve 18 and fluid directional valve 32 can include either purely manual operated variants for selective cleaning of the filter screens. Alternatively, the valves are designed to incorporate any type of timer activation, such akin to but not limited to a remote processor unit such as utilized with a conventional sprinkler operation. Without limitation, the present invention contemplates any of wired or remote (e.g. Bluetooth® or Near Field Communication) technology for operating the filter cleaning assembly on a given schedule, such as coinciding with periods of heavy airborne contaminants such as caused by airborne debris which becomes lodged into the filter screen exterior.

The individual nozzles 34/36 are arrayed at any desired width spacing along the length of the spray conduits (such as including without limitation spacing the nozzles up to twelve inches apart) and are angled downwardly at any angle between zero to ninety degrees (see also as further described in reference to FIGS. 3-5) in order to provide an optimal angled cleaning of the filter screens 6/8 from a top edge downward. The angling of the nozzles, in combination with the desired pressure of the applied spray, is further intended to generate a continuous curtain of clearing water which will progressively wash downward the accumulated debris located on the exterior of the intake mounted filter 6/8, with the debris eventually being deposited on the ground underneath the exterior mounted intake structures 2/4 or collected in ground supported drain (not shown) for removal.

Figure 3:
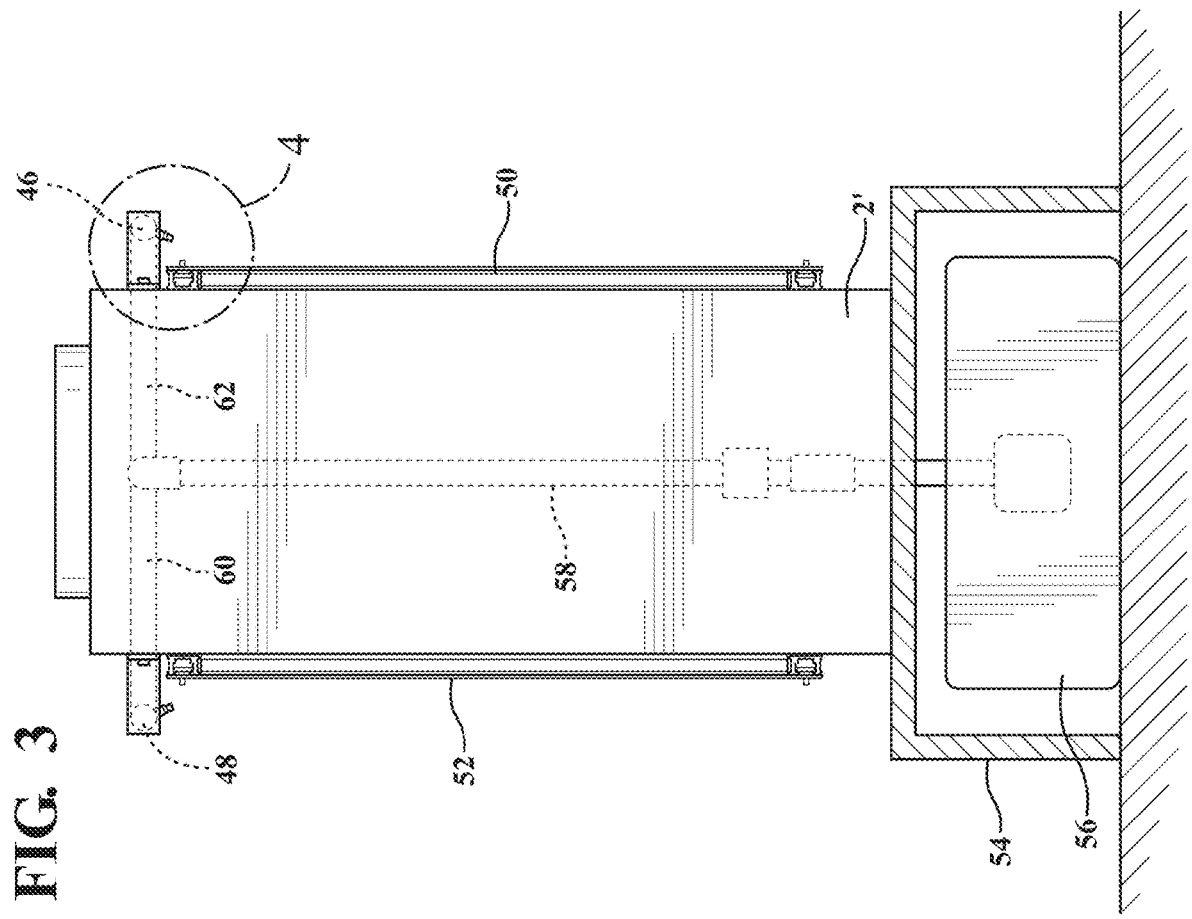
FIG. 3 is a side plan view of the filter wash assembly substantially as previously shown and depicting the manner of securing the fluid spray wash tubes to the intake face above and forwardly spaced relative to the filter screens.

Proceeding to FIG. 3, a side plan is shown view of the filter wash assembly substantially as previously shown and depicting the manner of securing a pair of fluid spray wash tubes 46 and 48 relative to opposite intake faces so that the tubes 46/48 are located above and forwardly spaced relative to a pair of attached filter screens 50 and 52 which are secured to opposite intake opening configured faces of an alternately configured intake structure 2', such as which is mounted atop a ground supported platform or base pedestal 54. As further shown, a portable fluid reservoir 56 can be incorporated into an interior of the platform 54, such as in instances in which a ready supply of pressurized fluid is not readily available, and further depicted in phantom is an internal piping network including vertical supply line 58 and horizontal feeder or supply lines 60 and 62 for supplying pressurized fluid to the individual spray nozzles of the tubes 46 and 48.

Figure 4:
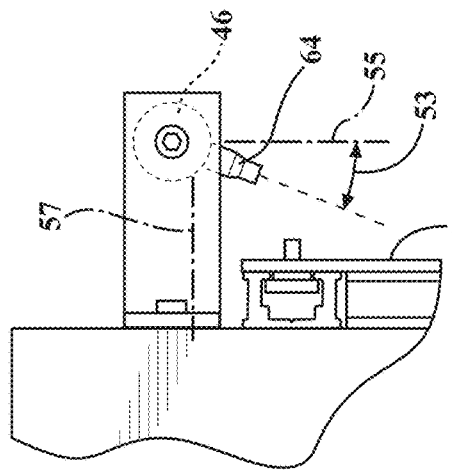
FIG. 4 is an enlarged view of the supply conduit designated in FIG. 3 and depicting the downward angle of the individual spray applicating nozzles relative to the upper edge extending surface of the filter screen.

FIG. 4 is an enlarged view of the supply conduit designated in FIG. 3 and depicting the downward angle of the individual spray applicating nozzles, see at 64 for selected tube 46 and relative to the upper edge extending surface of the filter screen 50. As further shown, the nozzles can be arranged at any downward arrayed and acute angle 53 between each of vertical 55 and horizontal 57 intersecting axes. The angle can also be fixed or selectively readjusted.

Figure 5:
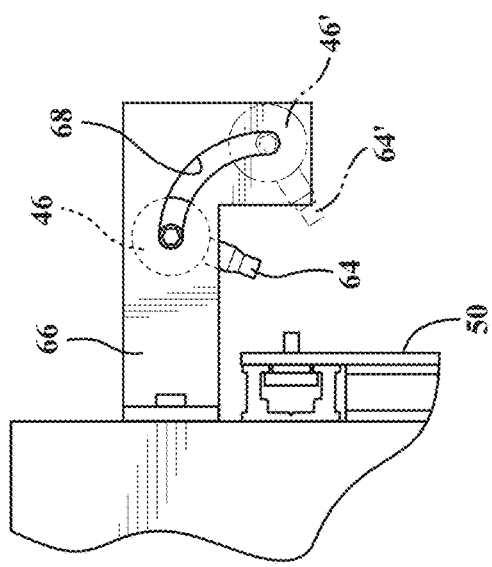
FIG. 5 is a view similar to FIG. 4 and illustrating an alternate arrangement of a fluid supply tube which is adjustable along an arcuate pathway configured in each of opposite end supporting plates between which the fluid conduit extends.

FIG. 5 is a view similar to FIG. 4 and illustrating an alternate arrangement of the fluid supply tube of FIG. 4, which is supported at opposite ends to alternately configured brackets as further shown at 66, and which allows the spray tube to be adjustable along an arcuate pathway 68 configured in each of opposite end supporting plates between which the fluid supply tube extends (see as further depicted by first position 46 and second arcuately adjusted position 46'). In this manner, the orientation or positioning and array of the individual nozzles configured in the fluid spray delivery conduit can be adjusted (from position 64 to that shown in 64') with the readjustment of the spray conduit (or tube).

Figure 6:
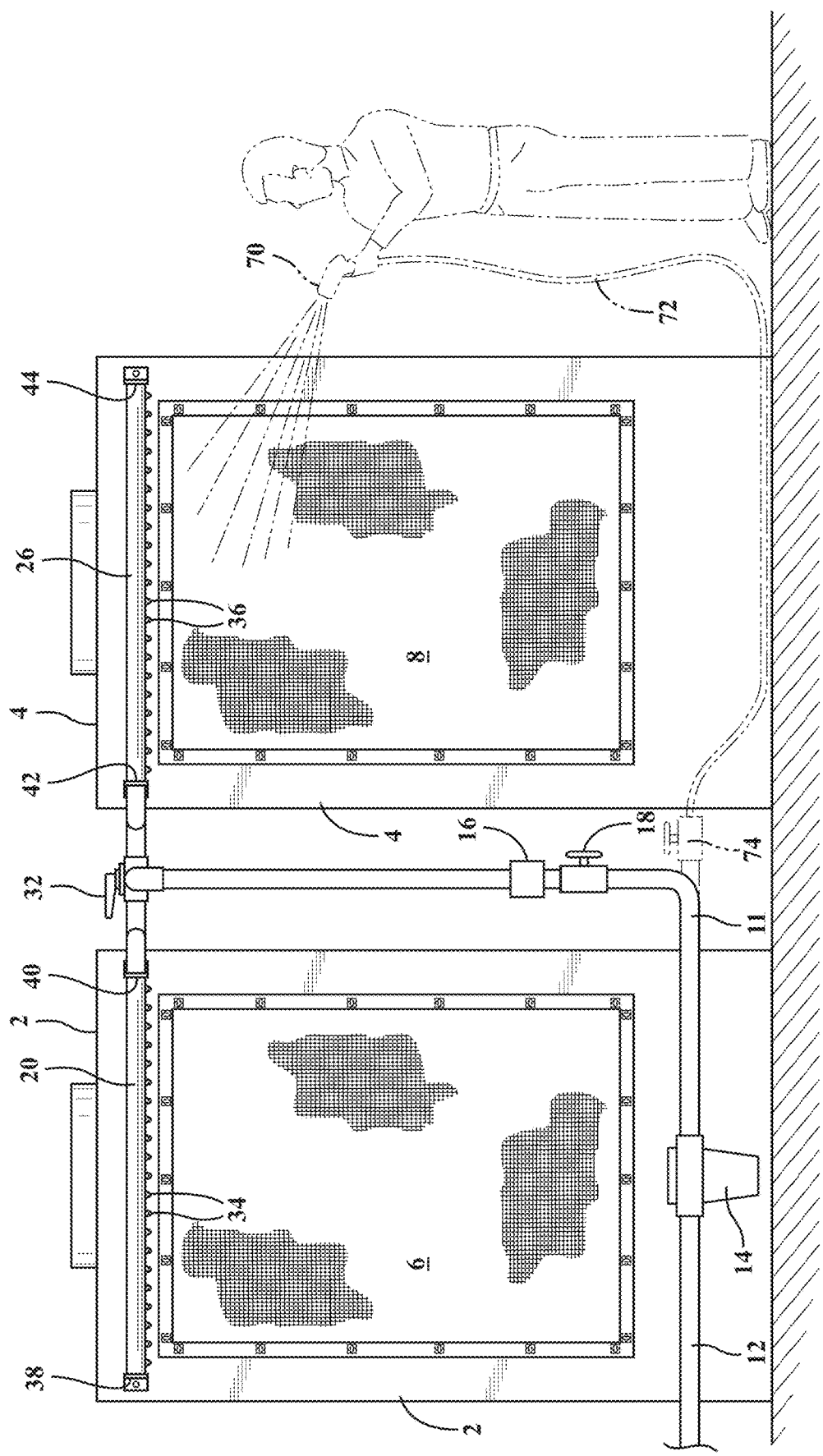
FIG. 6 is an illustration similar to FIG. 1 and depicting a separate supply attachment for feeding a hand-held spray washer.

FIG. 6 is an illustration similar to FIG. 1 and depicting a separate supply attachment for feeding a hand-held spray washer 70 and hose 72 from a tap location 74 associated with the inlet fluid supply line 12 depicted in FIG. 1. In this fashion, the fluid supplying architecture of the present invention provides for selective or spot washing of the filter additional to that provided by the single overhead mounted fluid supply conduits (see again at 20 and 26) with downwardly angled nozzles.

Figure 7:
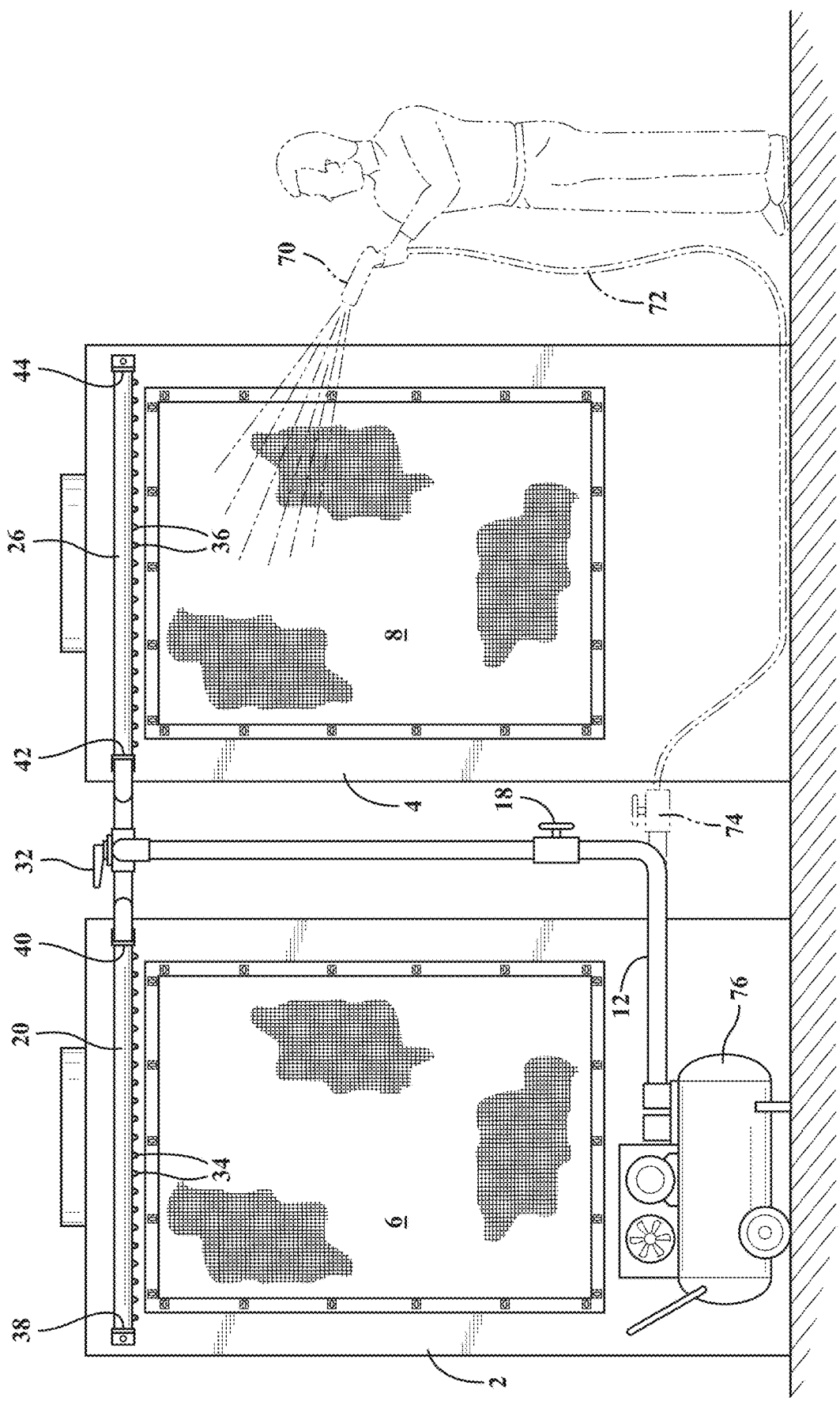
FIG. 7 is a similar view to FIG. 1 and depicting a further variant in which a portable air compressor is utilized for providing pressurized fluid to the overhead fixed conduit with nozzles, a separate spray washer being attached to a tap location of the fluid supply for feeding a hand held spray washer.

Proceeding to FIG. 7, a similar view to FIGS. 1 and 6 is provided and further depicts a further variant in which a portable compressor 76 is utilized for providing pressurization via input feeder or supply line 12, to the overhead fixed supply tube(s) with nozzles. The separate spray washer 70 with hose 72 can again be attached to the tap location 74 of the fluid supply as described in FIG. 6 and, in this instance to provide a supporting jet of pressurized air (as compared to water in FIG. 6) for clearing the accumulated debris from the exterior surface of the filter screens.

Figure 8:
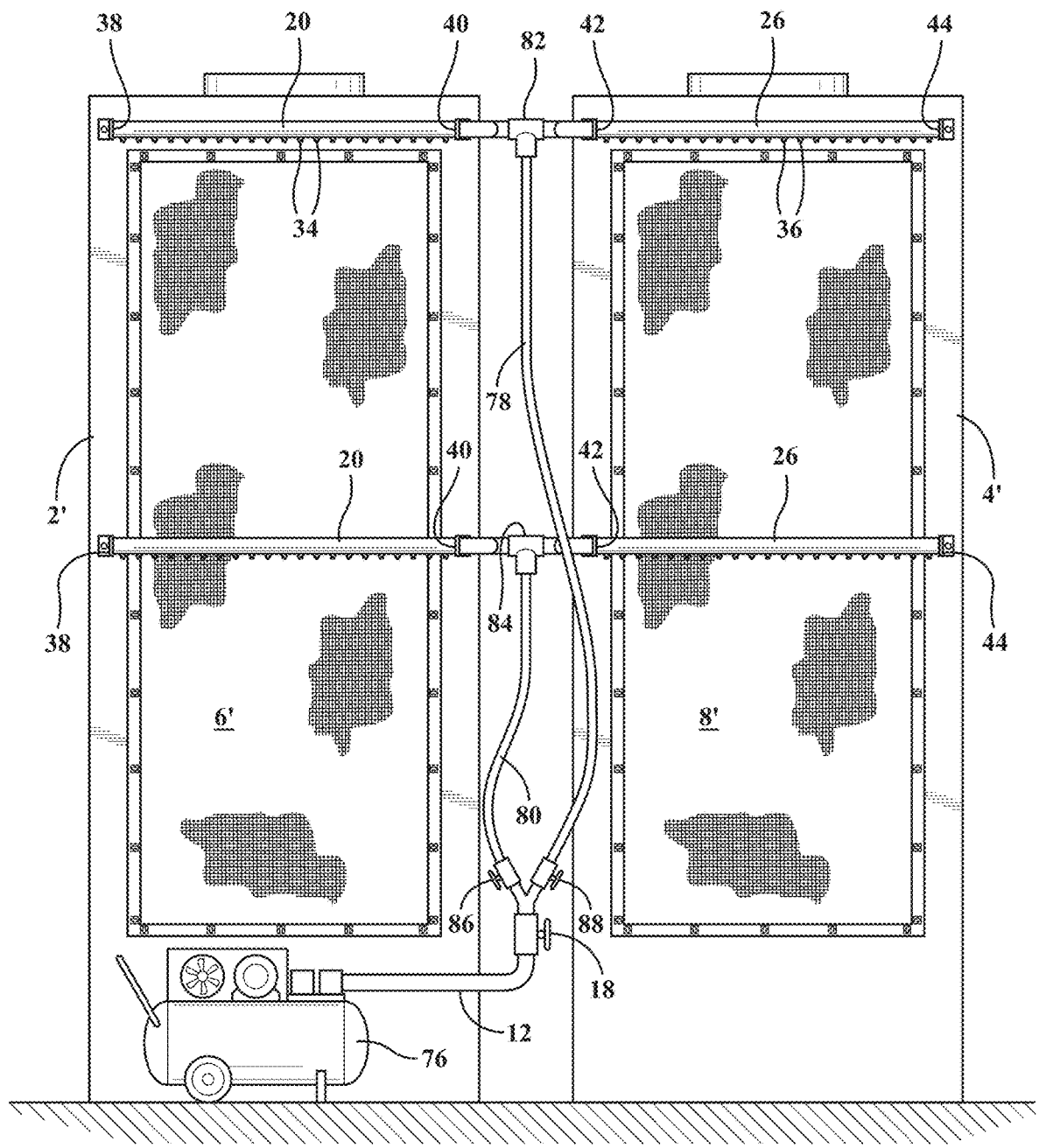
FIG. 8 is an environmental plan view of a further variant of a filter wash assembly incorporating multiple vertically spaced tiers of spray conduits secured to the cooling tower at vertically spaced and horizontal arrayed locations relative to the secured filter screen.

FIG. 8 is an environmental plan view of a further variant of a filter wash assembly similar to those previously described and incorporating multiple (see uppermost and intermediate) vertically spaced tiers of spray conduits 20/26, both again being secured to the cooling tower via similar arrangements of brackets 38/40 and 42/44 at vertically spaced and horizontal arrayed locations relative to reconfigured and elongated filter screens 6' and 8' adapted to being secured to redesigned and heightened intake structures 2' and 4'. As with prior embodiments, any pressurized water source is provided to supply line 12 and can include, without limitation, an attachable compressor 76.

Also shown in FIG. 8 are individual (rigid or as shown flexible) fluid conduit connections, see at 78 and 80, extending from the common supply valve 18, these connected to each of the upper and intermediate mounted pairs of fluid supply conduits via "T" fittings (upper 82 and lower 84). As further shown, the fluid conduit connections can include both rigid and flexible lines and which, in combination with individual takeoff valves 86 and 88, provide for either of concurrent or successive operation of the attached wash or spray conduits in order to clear the accumulated debris or impediments from the reconfigured filter screens 6'/8' which are secured to the intake unit openings.

Figure 9:
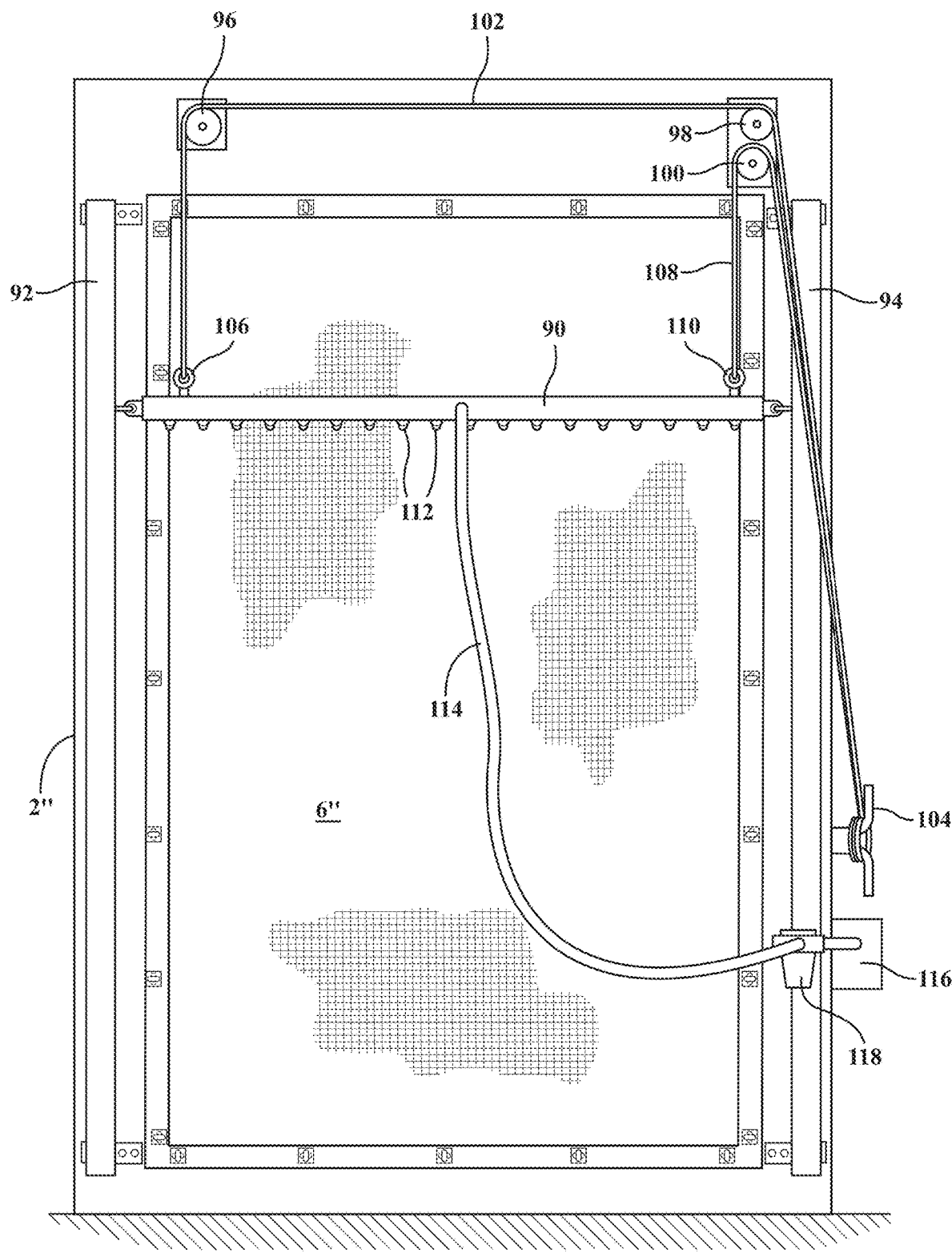
FIG. 9 depicts a single vertically adjustable fluid supply tube supported by a pair of bracket mounted channel defining tracks and further including overhead pulley mounts for traversing the supply tube over the height of the filter screen.

FIG. 9 depicts a further variant of a filter screen cleaning system drawing elements depicted in prior embodiments and incorporating a single vertically adjustable and horizontally arrayed fluid supply tube 90 supported by a pair of bracket mounted channel defining tracks 92 and 94 and further including overhead pulley mounts, these including at 96 on a first side and dual pulleys 98 and 100 on the second side. A pair of ropes or lanyards include each of a first lanyard 102, this extending from a cleat 104 to a first mounting location 106 at a first end of the traversable fluid supply tube 90, as well as a second lanyard 108 extending from the cleat 104 to a second end mounting location 110.

The supply tube 90 includes an array of downwardly angled nozzles 112 which are arrayed opposing a further reconfigured filter screen 6″ which is attached to a further redesigned air intake unit 2″. A flexible fluid conduit delivery hose is shown at 114 connecting at one end to the adjustable supply and delivery tube 90 and at another end to fluid delivery location, this further depicted at 116 and understood to incorporate any remote hookup for providing pressurized fluid to the assembly. A suitable pump or filtration means (collectively depicted at 118) is provided for delivering a pressurized fluid spray to the horizontally extending tube, pipe or conduit 90 for applying through the nozzles 112 to the surface of the filter screen 6″.

Figure 10:
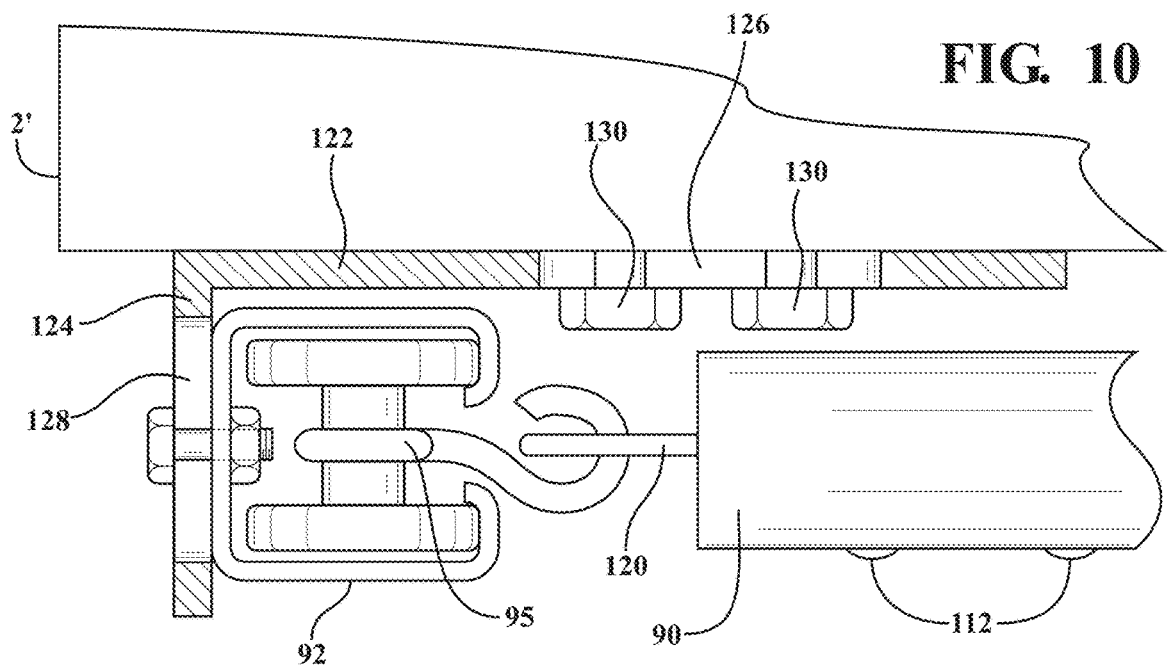
FIG. 10 presents an partial overhead plan view of a given channel track with roller supported hook engaging an end of the vertically adjustable fluid supply tube.

FIG. 10 presents a partial overhead plan view of the given channel track (left side again as shown at 92) with roller supported hook 95 seated within the channel track and engaging an eyelet defining and projecting flange end 120 of the vertically adjustable fluid supply tube. As will be described in reference to succeeding views, including FIG. 20, a single one of the channel tracks 92 can be reoriented so that it is suspended in horizontally arrayed fashion along a top of the intake structure above the opening.

Figure 11:
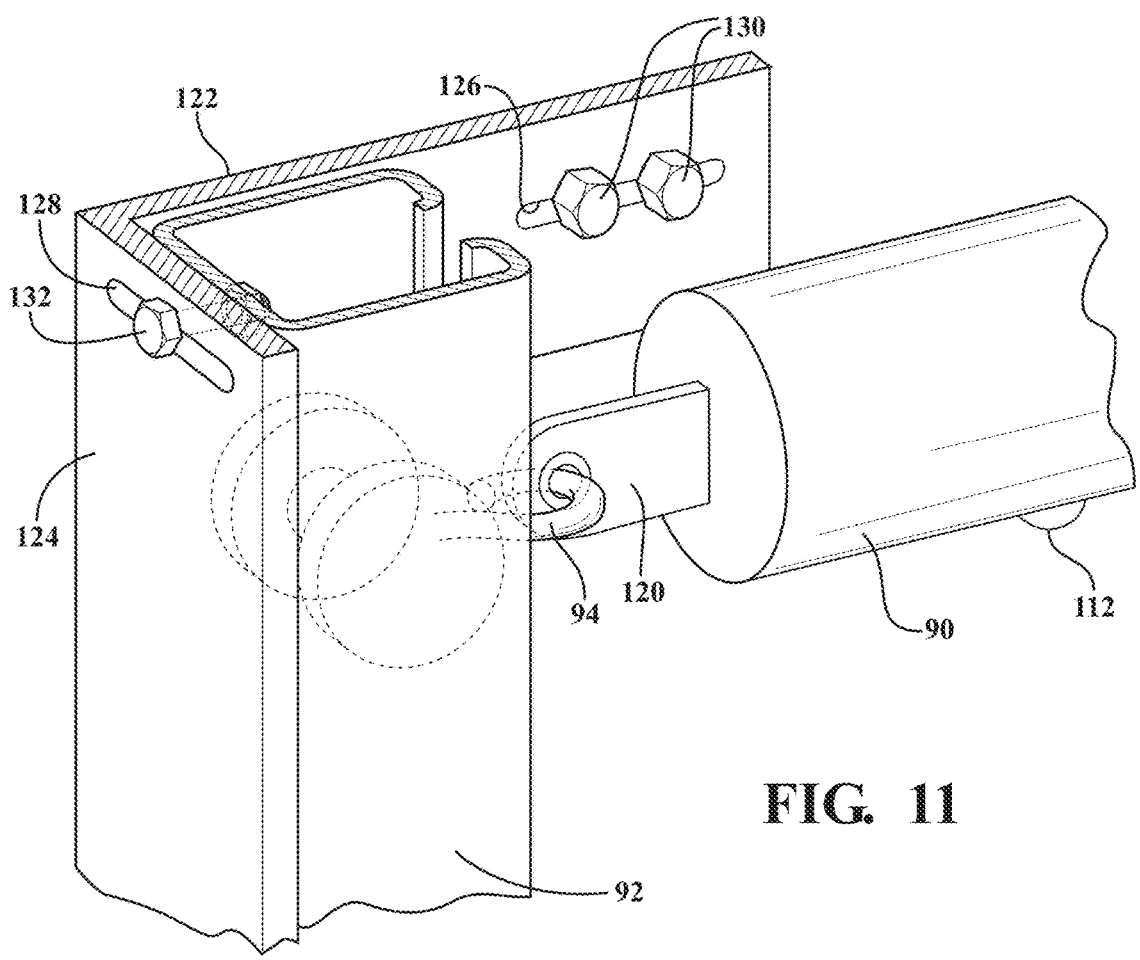
FIG. 11 presents a rotated perspective view of FIG. 10 and better illustrating the multi-axial adjustability of "L" shaped brackets supporting each of the vertically extending channel tracks.

FIG. 11 presents a rotated perspective view of FIG. 10 and better illustrating a multi-axial adjustable "L" shaped brackets, this having a first leg or side 122 secured to the air handling unit surrounding the air intake opening, as well as a second angled leg or flange 124 to which the channel defining track 92 is mounted so that it faces inwardly across the intake opening in an opposed arrangement with the similarly mounted and opposite facing channel track 94 in FIG. 9. As further shown, elongated slots are horizontally configured into each of the first leg 122 (at 126) and the second angled leg 124 (at 128) and, in combination with individual bolt and nut fastener sets 130 and 132, provide for multi-axial adjustability of the track sections 92/94 relative to the intake face for positioning the width extending supply tube 90 relative to the forward exposed surface of the filter 6″.

Figure 12:
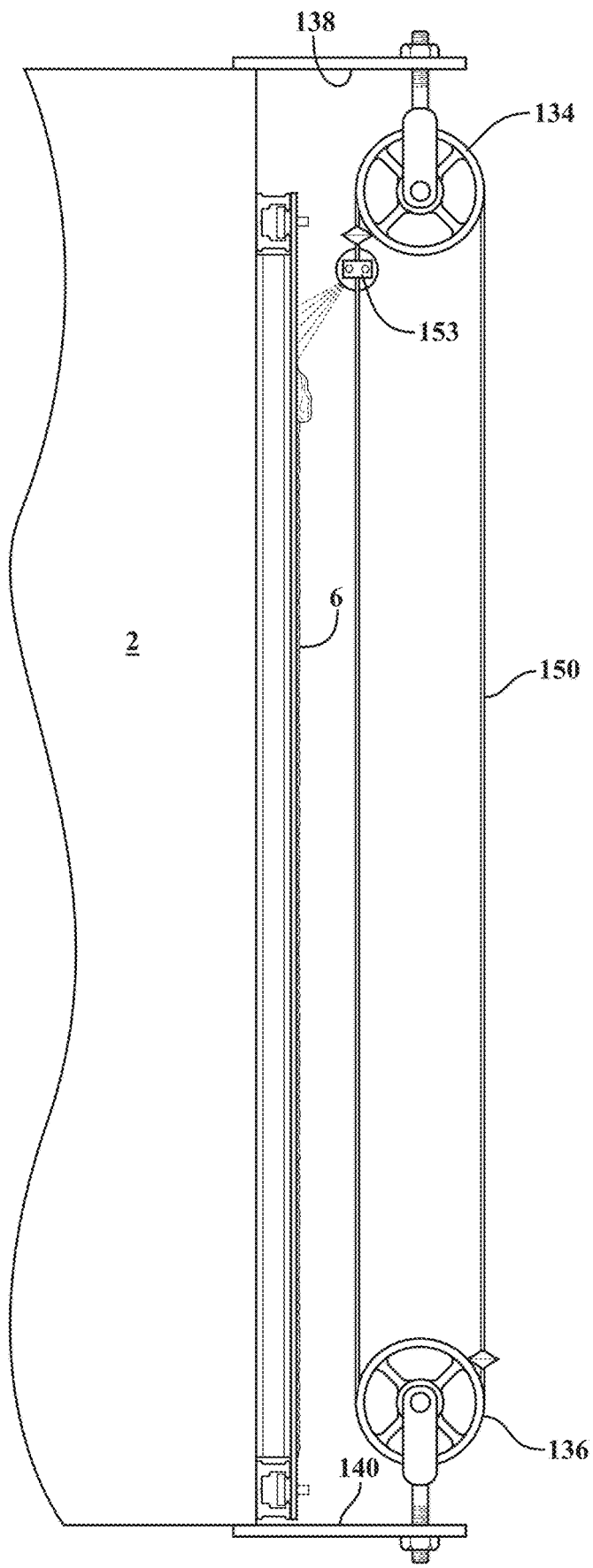
FIG. 12 is a side plan view illustration of an alternate pulley mount arrangement for supporting a single horizontally arrayed and vertically adjustable feed tube for progressively cleaning an exterior mounted filter screen.
Figure 13:
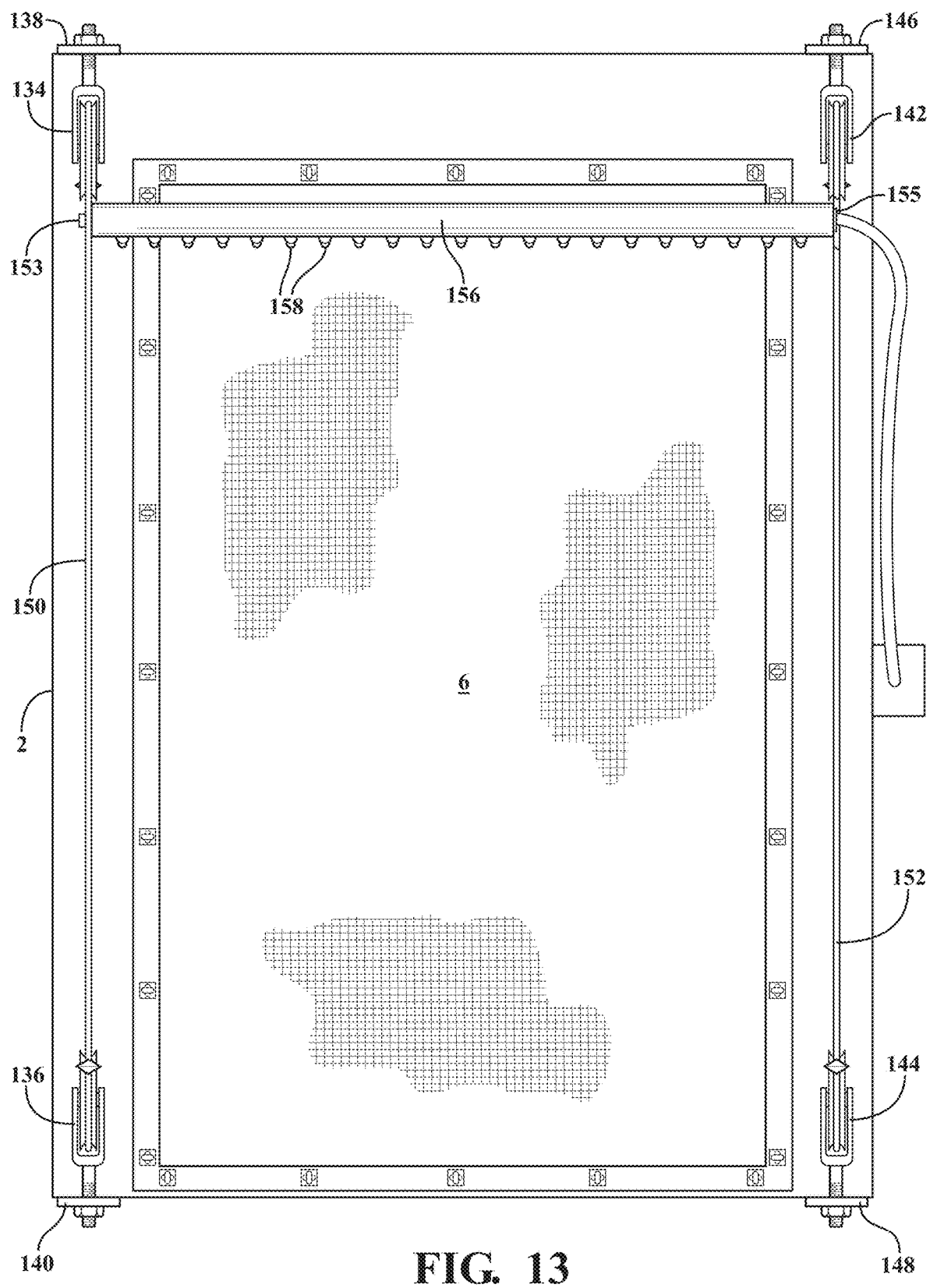
FIG. 13 presents a rotated front plan view of the pulley arrangement of FIG. 12.
Figure 14:
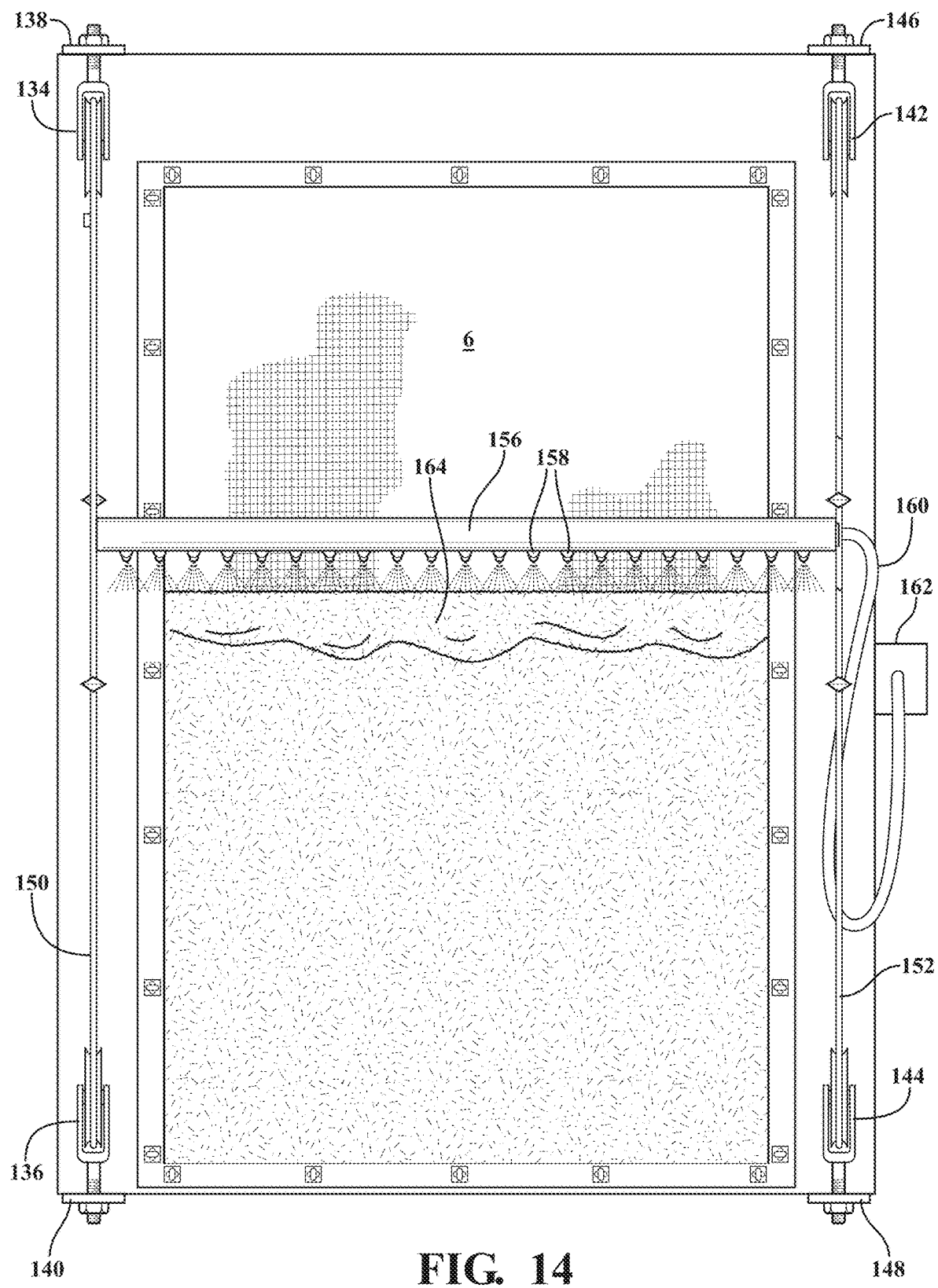
FIG. 14 is a succeeding illustration to FIG. 13 and depicting the pulley supported fluid spray conduit at an intermediate descending cleaning location along the mounted filter screen.

Proceeding to FIGS. 12-14 on combination, each of a side and rotated front plan views illustration are shown of an alternate pulley mount arrangement in which a pair of pulley subassemblies are mounted in vertically fashion along opposite vertically extending sides of the front intake surface. This includes a left-sided positioned upper pulley 134 and lower pulley 136 which are secured via brackets 138 and 140 and a right-sided positioned upper pulley 142 and lower pulley 144 which are secured via brackets 146 and 148, both in forwarded arrayed fashion relative to a front intake face of a suitable intake structure (again at 2), and over which is secured a filter screen 6.

Continuous looped ropes 150 and 152 are provided around the left and right side pulley arrangements, these supporting therebetween (via smaller left and right end attached strap brackets 153/155) a single horizontally arrayed and vertically adjustable feed tube 156 with downwardly and inwardly angled spaced apart nozzles 158 for progressively cleaning an exterior mounted filter screen 6. A flex pressurized fluid line 160 extends from a remote fluid delivery source 162 and connects to a selected end of the spray issuing tube 156 for delivery through the nozzles to the surface of the filter screen 6.

FIG. 13 again presents the rotated front plan view of the pulley arrangement of FIG. 12 in a pre-cleaning operation, with succeeding FIG. 14 depicting the pulley supported fluid spray conduit 156 being translated downwardly, via displacement of either of the end pulley arrangements and shown at an intermediate descending cleaning location along the mounted filter screen. In this fashion, accumulated debris or dirt (see at 164) is caused to be progressively washed and cleared downwardly from the screen 6 concurrent with downward translation of the pulleys.

Figure 15:
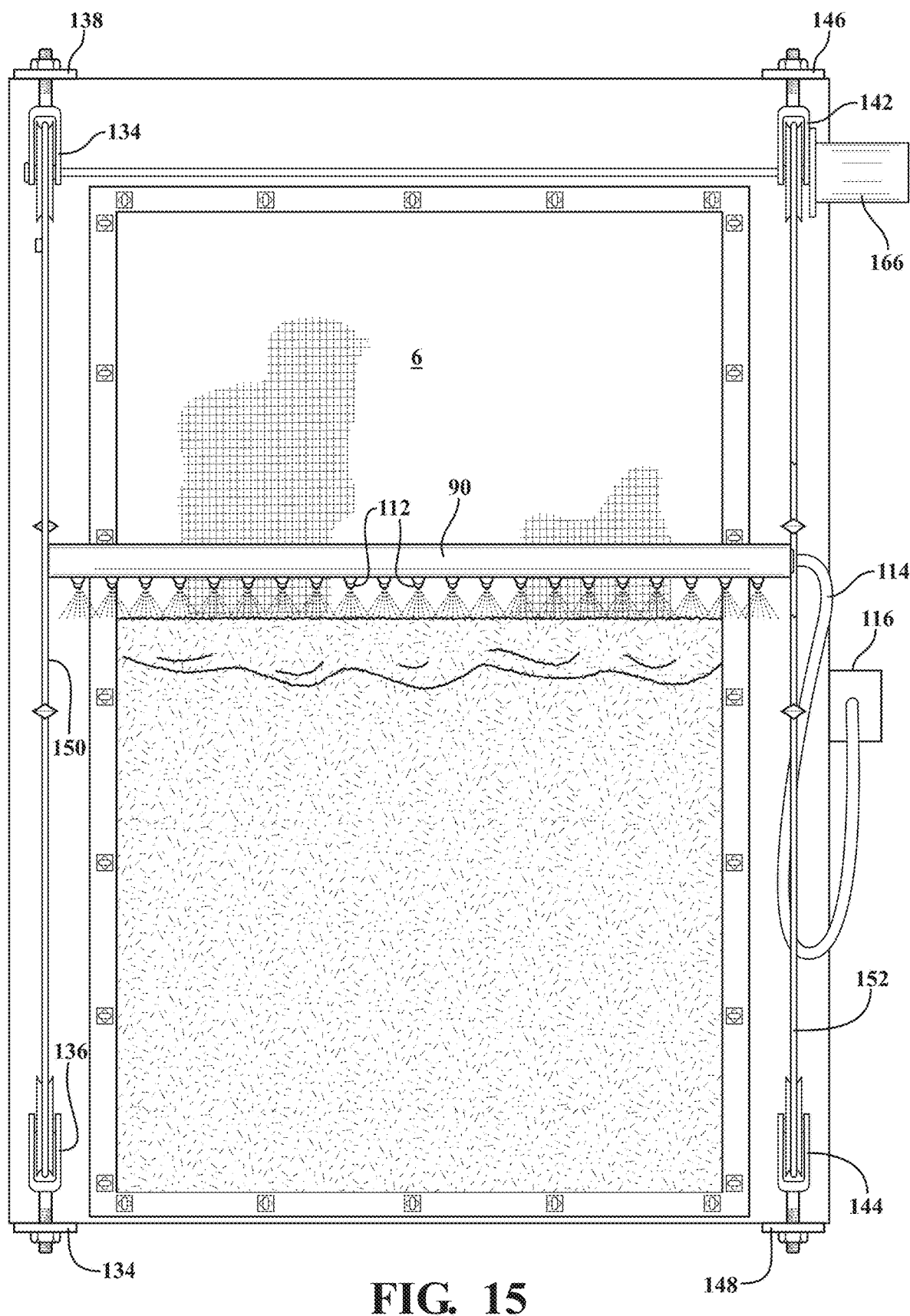
FIG. 15 is an illustration similar to FIG. 14 and depicting a motorized version of the vertically adjustable pulley arrangement of FIGS. 12-14.

FIG. 15 is an illustration similar to FIG. 14 and depicting an electric motorized version (see upper end supported electric motor 166 incorporated into the right side vertically adjustable pulley arrangement of FIGS. 12-14). In this fashion, the spray tube 90 can be activated and vertically displaced through a powered or, as suitable, automated fashion for providing iterative cleaning of the filter screen at certain intervals. Consistent with the previous description, any suitable timer can be incorporated into the motor 166, as with the fluid activation valves, and in order to execute a complete filter cleaning cycle on either a timed or on-demand situation.

Figure 16:
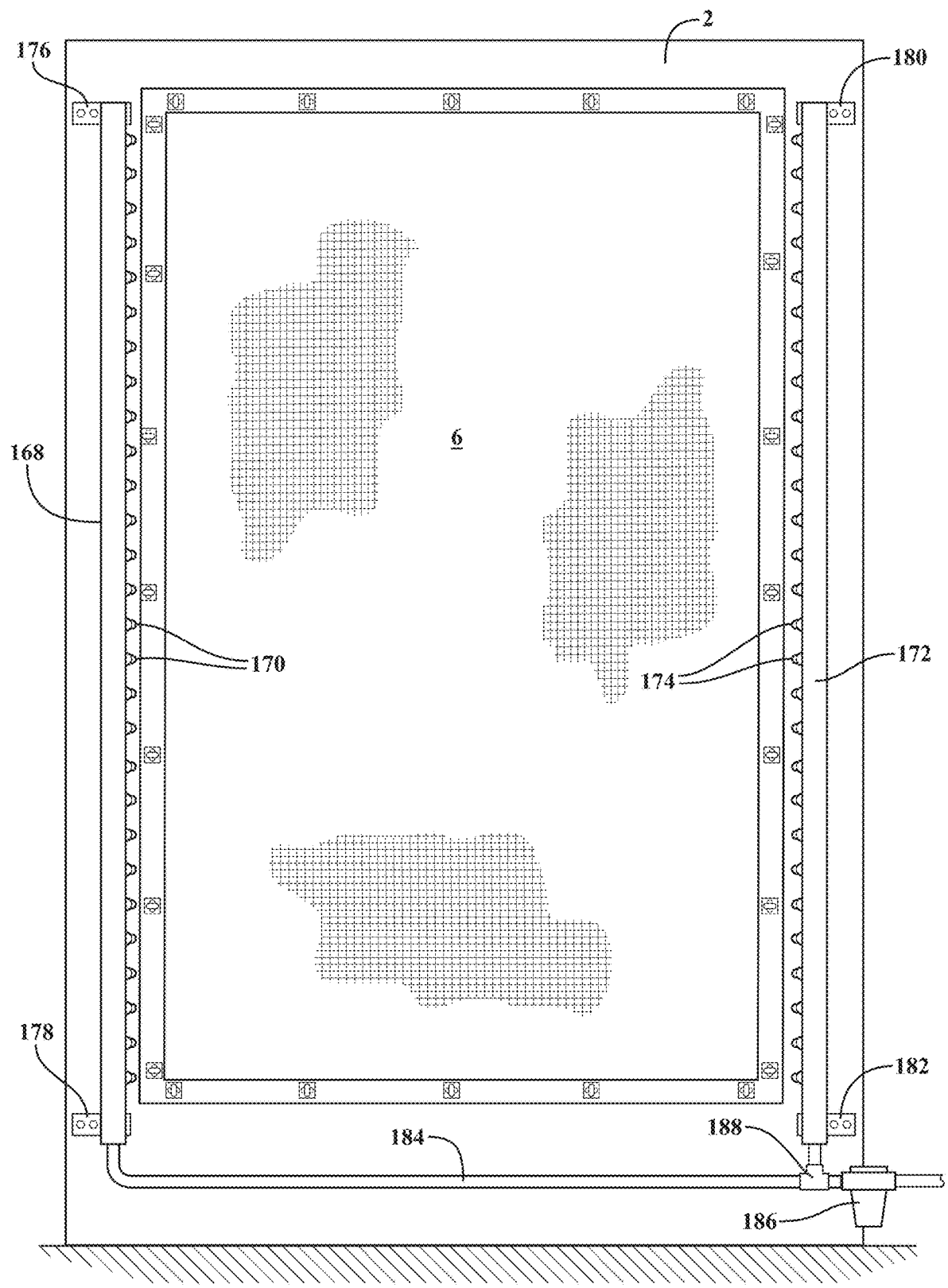
FIG. 16 depicts a plan view of a further variant of any of a filter wash, cleaning or clearing assembly including a pair of opposite vertical edge arrayed fluid supply tubes with spaced apart spray applicating nozzles.

Proceeding to FIG. 16, a plan view is shown of a further variant of filter wash assembly including a pair of opposite vertical edge arrayed fluid supply tubes, including left handed or left side tube 168 with angled nozzles 170 and corresponding right handed or right side tube 172 with opposingly angled nozzles 174. The vertically arrayed supply tubes are secured via brackets (see upper 176 and lower 178 for left handed tube 168 and upper 180 and lower 182 for right side tube 172).

A supply line 184 with any suitable filtration or pump input (see as generally shown at 186) is provided for delivering fluid to each of the left side tube 168 and the right sided tube 172 (via T fitting 188). The angling of the individual spaced apart pluralities of the nozzles 170 and 174 is further such that they are capable of each covering up to one half the overall width of the filter screen 6 and provide adequate clearing of accumulated debris without requiring adjustment.

Figure 17:
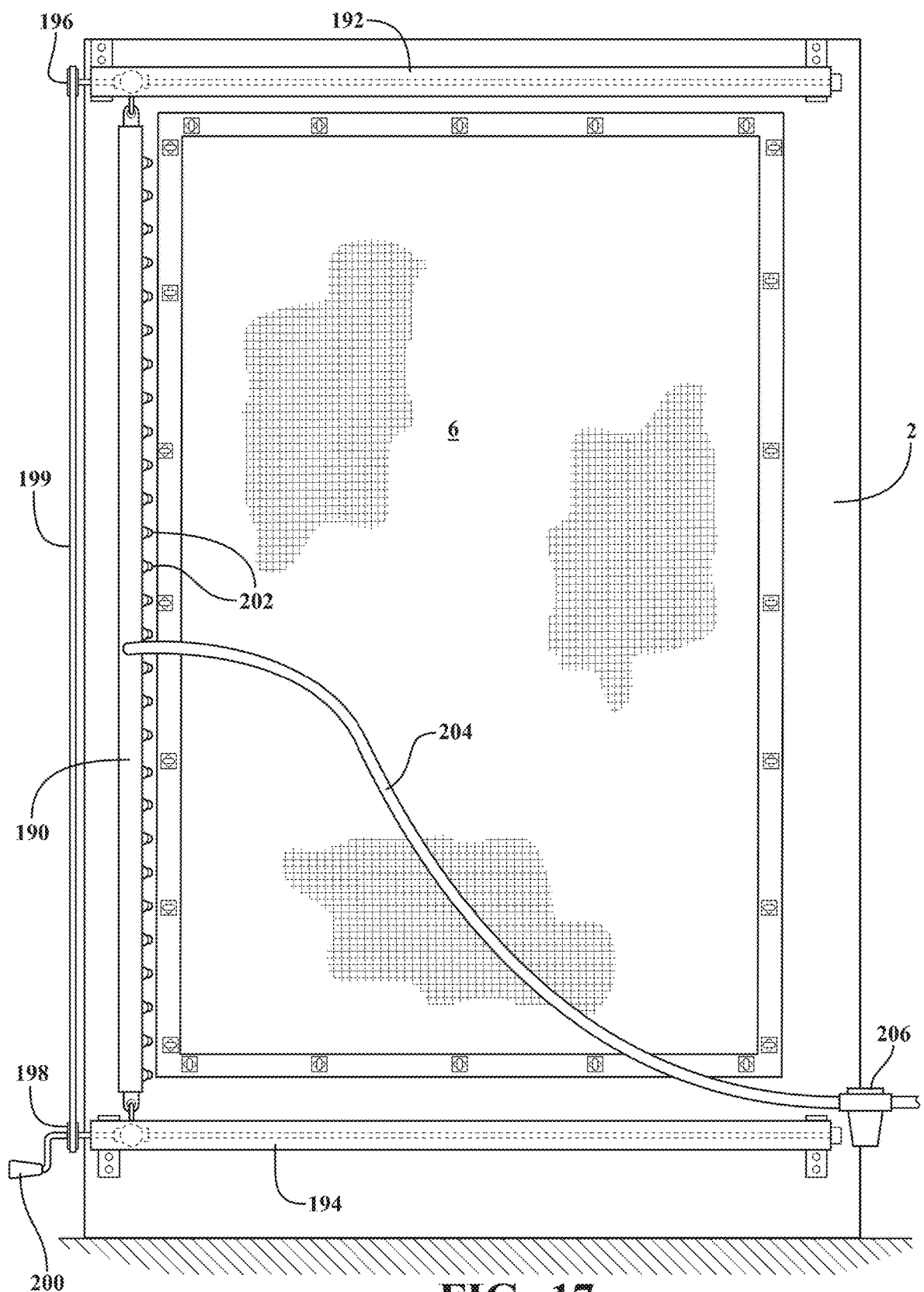
FIG. 17 presents a plan view of an alternate arrangement of a filter wash assembly in which a similar track mounted configuration to that shown in FIGS. 9-11 is provided for traversing in a width extending direction a single vertically extending and horizontally supported fluid spray conduit over the filter screen.

FIG. 17 presents a plan view of an alternate arrangement of a vertically extending and horizontally adjustable filter wash assembly in which a similar track mounted configuration to that shown in FIGS. 9-11 is provided for traversing in a width extending direction a single vertically extending and horizontally supported fluid spray conduit 190 over the filter screen 6. A variation of upper 192 and lower 194 mounted channel tracks is depicted, similar to that previously described, and is provided in combination with redesigned left sided pulleys (upper 196 and lower 198) which are integrated into the tracks 192/194 and operate, in combination with a looped conduit 199 and a lower crank handle 200 associated with the lower track 194, in order to progressively advance the spray tube 190 across the screen so that its inwardly angled nozzles 202 provide for progressive cleaning (or clearing) of debris from the exterior surface of the filter screen 6.

It is understood that any of matching worm gear arrangements or the like can be incorporated into the interface between the pulleys and the channel tracks in order to facilitate displacement of the spray tube 190 along the upper and lower channel tracks 192/194. A flexible supply line 204 is provided extending from an intermediate location of the fluid supply tube 190 to a remote fluid supply (see as collectively represented by any of a filter or pump 206).

Figure 18:
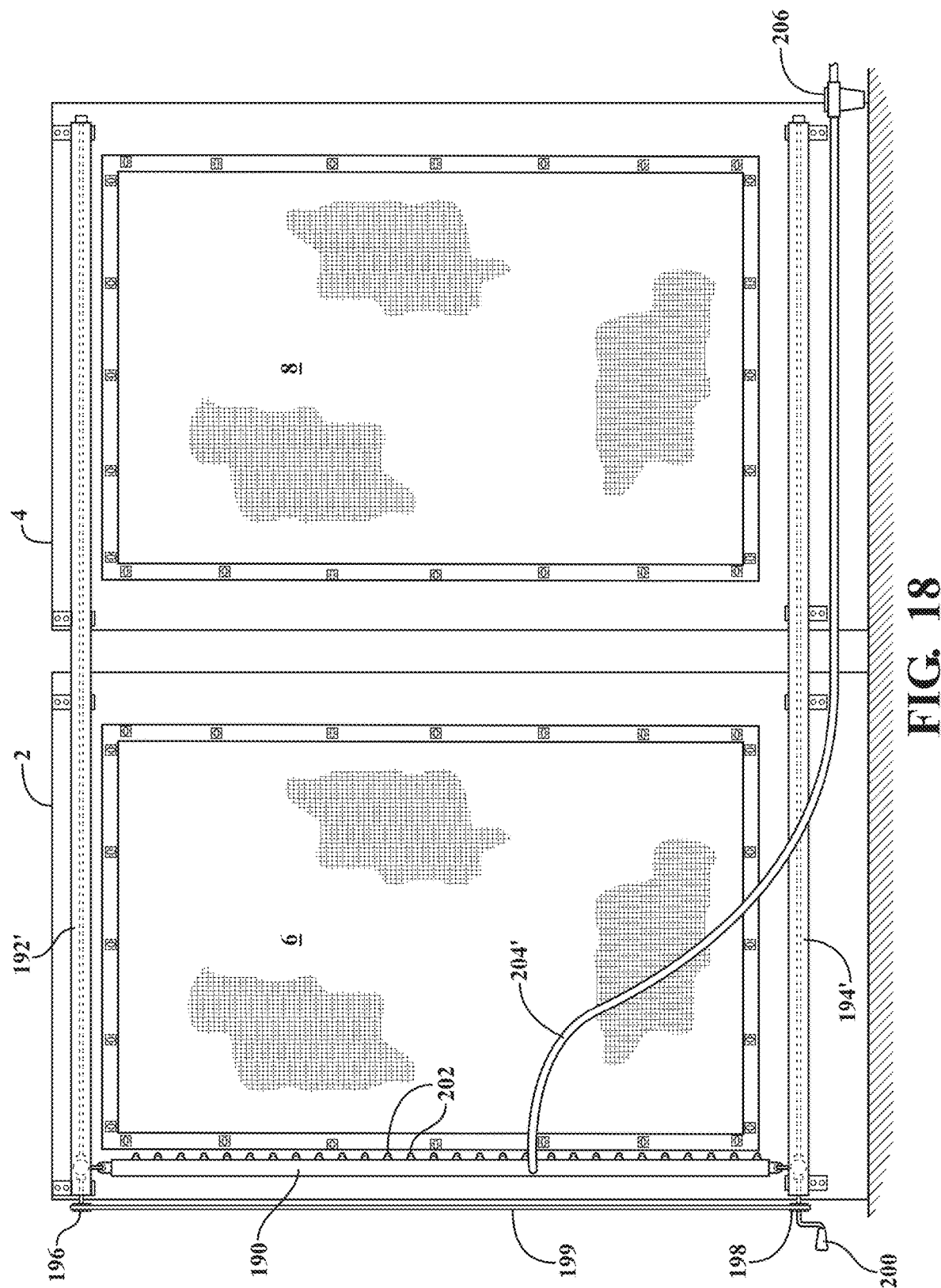
FIG. 18 presents a similar illustration to FIG. 17 and depicting a similar adjustably mounted spray conduit which can displace along a width of a pair of intake openings associated with an intake structure.

FIG. 18 presents a similar illustration to FIG. 17 of a dual intake structure 2/4 such as in FIG. 1, and depicting a similar adjustably mounted spray conduit 190 which can extend vertically and displace along a width of a pair of intake openings associated with one or, as shown, dual or other multiple intake structures 2 and 4. The illustration of FIG. 18 is largely identical to that depicted in FIG. 17, with the exception that the upper and lower affixed tracks, depicted at 192'/194', are lengthened from that shown in FIG. 17 in order to accommodate the combined width of both the intake openings of screens 6 and 8 and to permit the width traversing of the vertically arrayed and supported spray tube/conduit 190 across the multiple intake openings.

A redesigned and lengthened flexible supply tube 204' is also provided, as shown connected to a lower location of the vertical supply tube 190, extending from a fluid supply take-off location 206 (e.g. again including without limitation any of a pump or filter integrated into the fluid supply network), the flexible supply tube accommodating the range of displacement of the vertically extending and horizontally adjustable spray tube 190 in the manner previously described. As with prior embodiments, the advancing structure can be manual, powered or automated utilizing any suitable known components.

Figure 19:
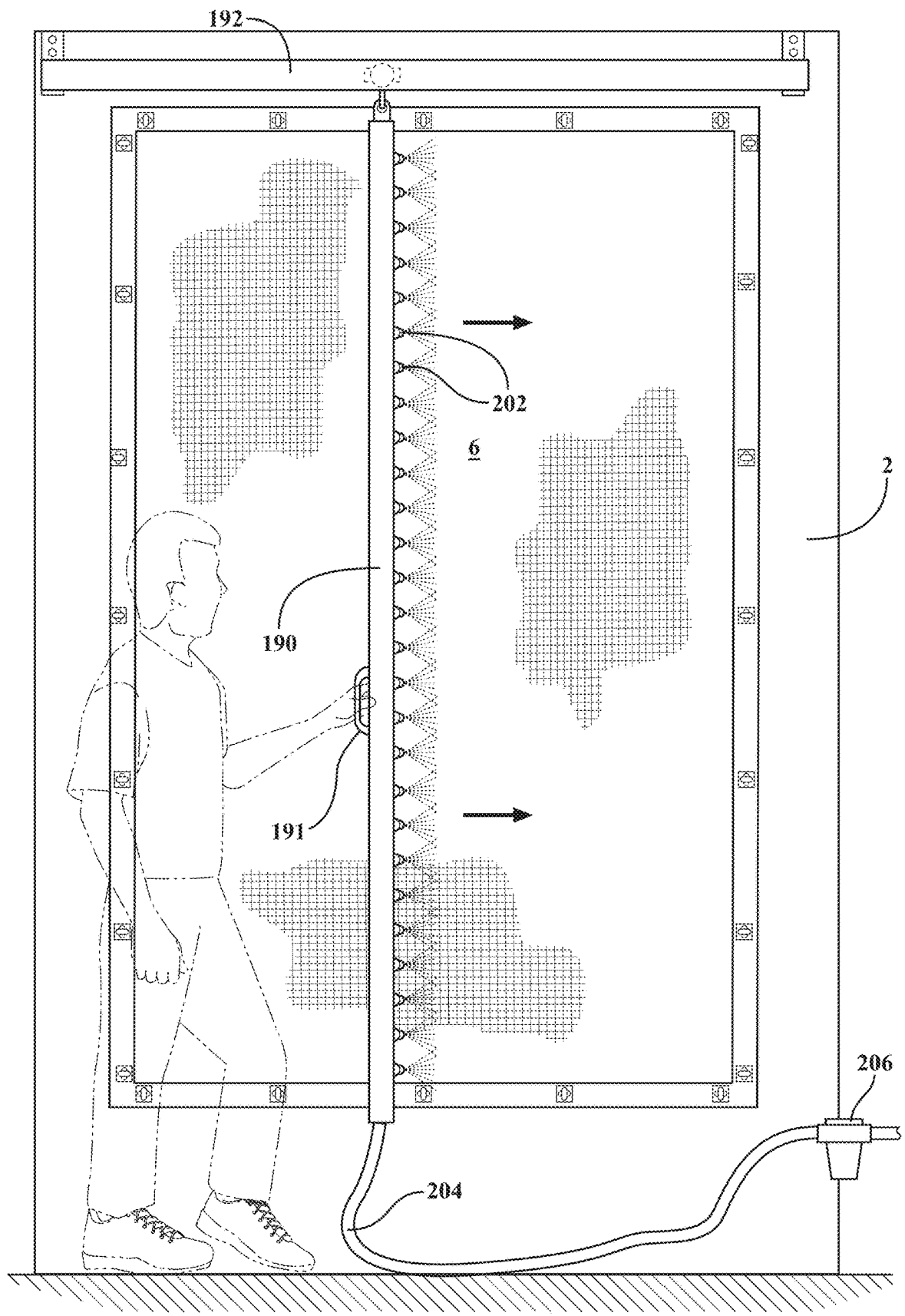
FIG. 19 is an illustration of a single spray tube suspended from an upper horizontally mounted track for traversing widthwise by an individual situated at ground level.

FIG. 19 is an illustration of a single spray tube or conduit (again at 190) suspended from only an upper horizontally mounted track (again at 192 as shown in FIG. 17) for permitting traversing of the rigid tube or conduit widthwise by an individual at ground level. The assembly according to this variant can also be adapted for traversing widthwise across multiple cell or intake openings associated with a single cooling tower structure, such as again generally represented at 2 and upon the operator walking width of the given intake structure and traversing the vertical extending supply tube along the upper horizontal track 192 via the suspending rollers (see again at 94). Also shown is a gripping handle 191 which is secured to the vertically arrayed tube 190 at a midpoint location easily accessible to the operator during traversing of the roller supported supply tube 190.

Figure 20:
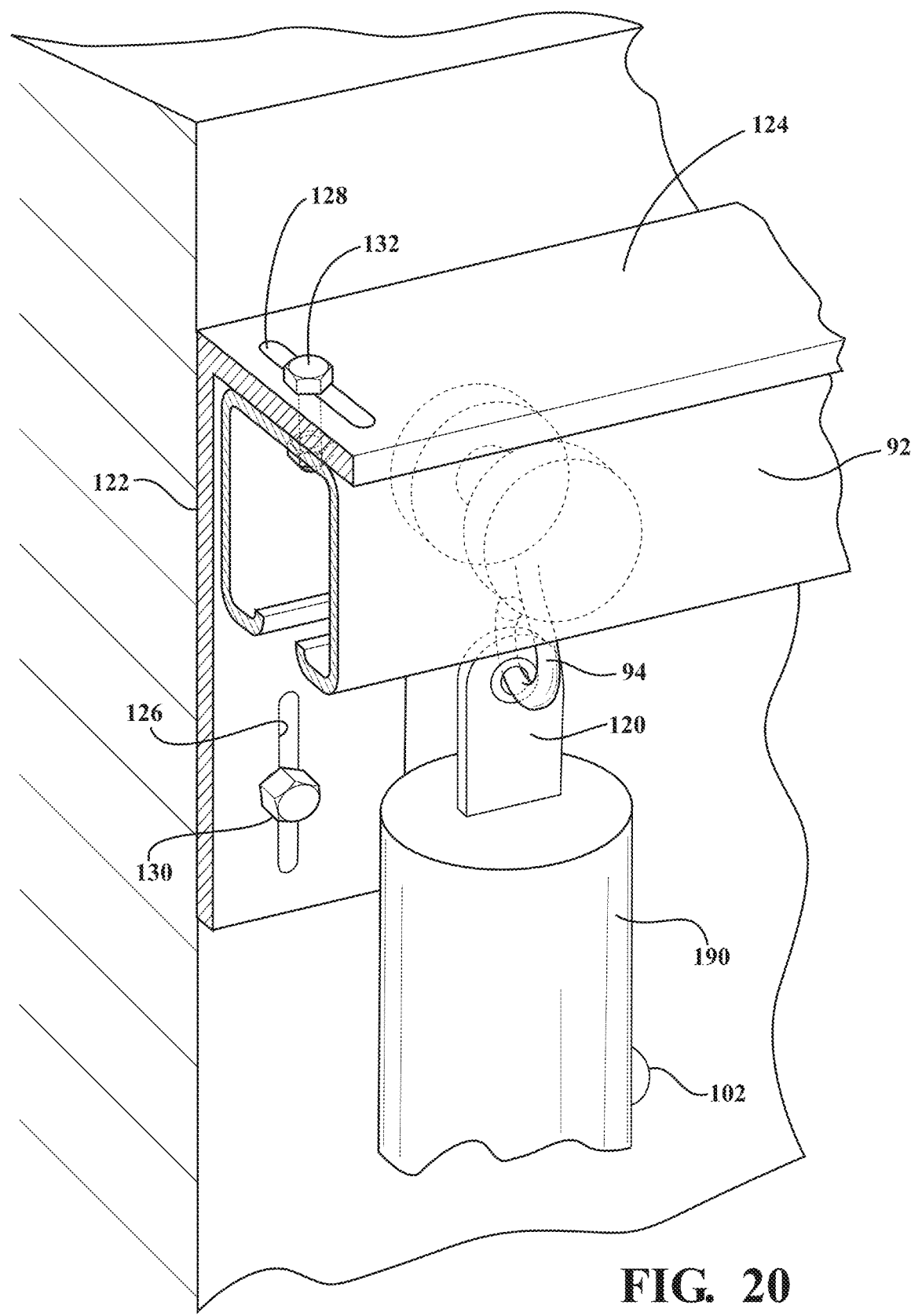
FIG. 20 is an illustration similar to FIG. 11 of a multi-axial adjustable "L" bracket supporting the upper horizontal channel track of FIG. 19.

FIG. 20 provides an illustration similar to FIG. 11 of a multi-axial adjustable "L" bracket supporting the upper horizontal channel track 92 of FIG. 19. As with the earlier variant, the multi-axial adjustable "L" shaped bracket includes each of first leg or side 122 secured to the air handling unit surrounding the air intake opening, as well as a second angled leg or flange 124 to which the channel defining track 92 is mounted so that it faces inwardly across a top of the intake opening.

As further shown, elongated slots are horizontally configured into each of the first leg 122 (at 126) and the second angled leg 124 (at 128) and, in combination with individual bolt and nut fastener sets 130 and 132, provide for multi-axial adjustability of the track section 92 relative to the intake face for positioning the vertically extending and width adjustable tube 90 relative to the forward exposed surface of the filter. A single hook supporting roller 94 (see again as also shown in FIG. 10) is provided for supporting the upper end of the vertically arrayed feeder supply line 190 in a fashion which permits it to be horizontally traversed by the ground situated individual shown in FIG. 19.

Figure 21:
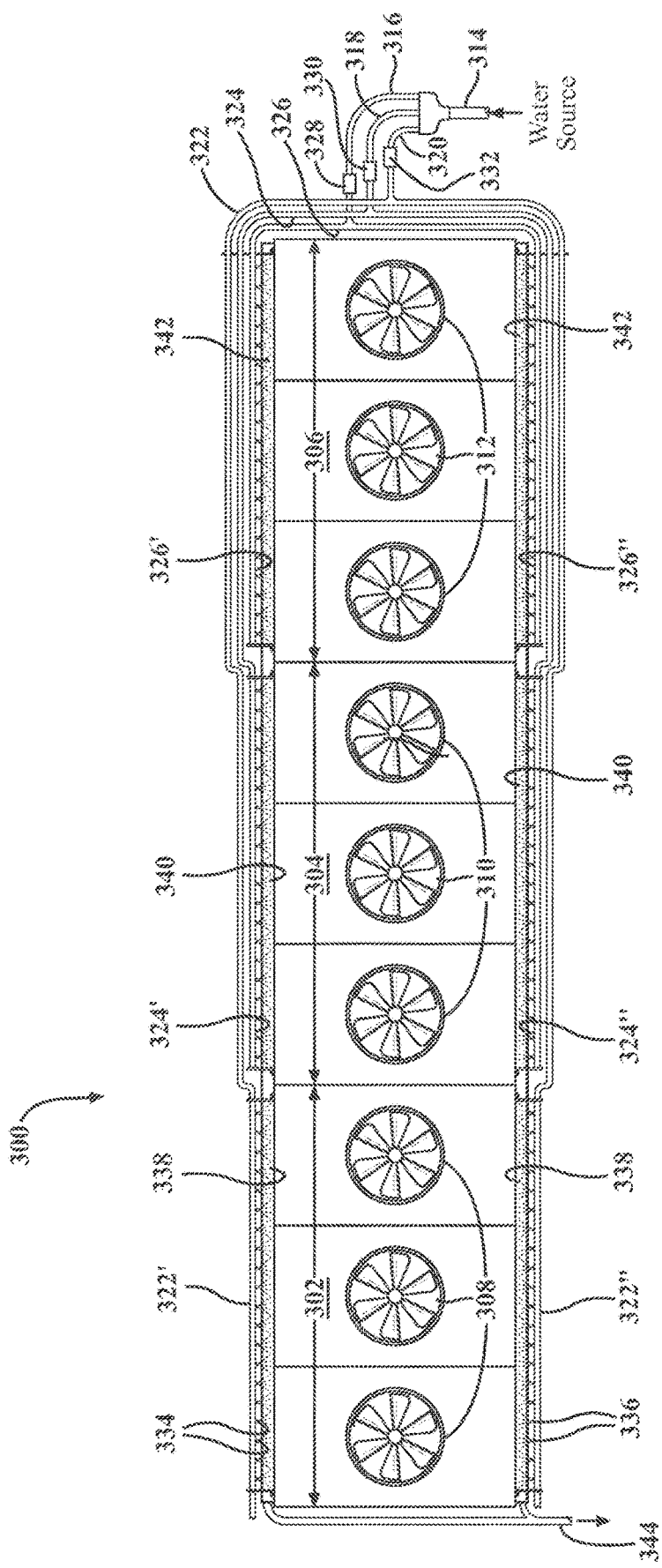
FIG. 21 is an overhead view of a cooling tower with dedicated control valve operated fluid feed conduits extending from a common water source to corresponding filter zones arranged on opposite sides of the cooling tower.

Referring now to FIG. 21, an overhead view is generally shown at 300 of a cooling tower, such as previously referenced and in the illustrated version including designated subset sections 302, 304, 306. The cooling tower sections each include any number of individual fans (see at 308, 310, 312, etc.).

By operation, a cooling tower is a heat removal device that uses water to transfer process waste heat into the atmosphere. Likewise, an industrial cooling tower operates on the principle of removing heat from water by evaporating a small portion of water that is recirculated through the unit. The mixing of warm water and cooler air releases latent heat of vaporization, causing the water to cool.

Industrial cooling towers are a critical component of many commercial and industrial processes, and environmental cooling applications and are found in every industry segment including data centers, power plants, production facilities, hospitals, schools, office buildings, chemical processing, steel mills, and many manufacturing companies where process cooling is necessary.

An industrial cooling tower can be larger than an HVAC system and is used to remove the heat absorbed in the circulating cooling water systems used in power plants, petroleum refineries, petrochemical plants, natural gas processing plants, food processing plants, and other industrial facilities. Beyond cooling towers, the present invention can be incorporated into any other air movement system not limited to air/water cooled chillers, condenser coil, heat exchangers, air intake louvres, rooftop units and the like.

A feeder fluid source is depicted at 314 and branches into plural intermediate conduits, shown at 316, 318 and 320, these communicating with individual fluid delivery conduits further depicted at 322, 324 and 326 respectively, each of these being generally arcuate shaped and which extend to opposite sides of the individual cooling tower sections 302, 304 and 306 (see further subset conduit sections 322'/322", 324'/324" and 326'/326" which align with the designated cooling tower sections 308/310/312).

Dedicated control valves are provided at 328, 330 and 332 respectively for each of the branching conduits 316, 318 and 320 operating the individual fluid feed conduits extending from the common water source to the corresponding filter zones arranged on the opposite sides of the cooling tower. Individual pluralities of spray nozzles, such as previously shown and representatively depicted at 334/336 for designated conduit sections 322'/322", are provided and which are secured in elevated extending fashion so that the nozzles are arrayed against the associated filter sections (see opposite side pairs at 338, 340 and 342) for providing any iterative or timed cleaning of the filter screens according to any of the processes previously described. The used fluid is then collected within the base of the cooling tower and disposed through a drain or other capture point 344.

The present invention can also provide for winterization capability for draining the individual lines according to any known procedure. Beyond the configuration illustrated, it is also understood that any plurality of cooling towers or other suitable air movement HVAC installation can be interconnected in any gang or network fashion. As further previously described, other variants can substitute the water spray conduits with any pneumatic or air supply tubes or conduits having air nozzles for issuing a high-pressure airflow in order to clear the exterior of the mounted filter. As also previously stated, this can further include connecting a high-pressure compressor to the fluid conduits in order to distribute the pressurized air through the nozzles and against the exterior surface of the filter screen.

Figure 22:
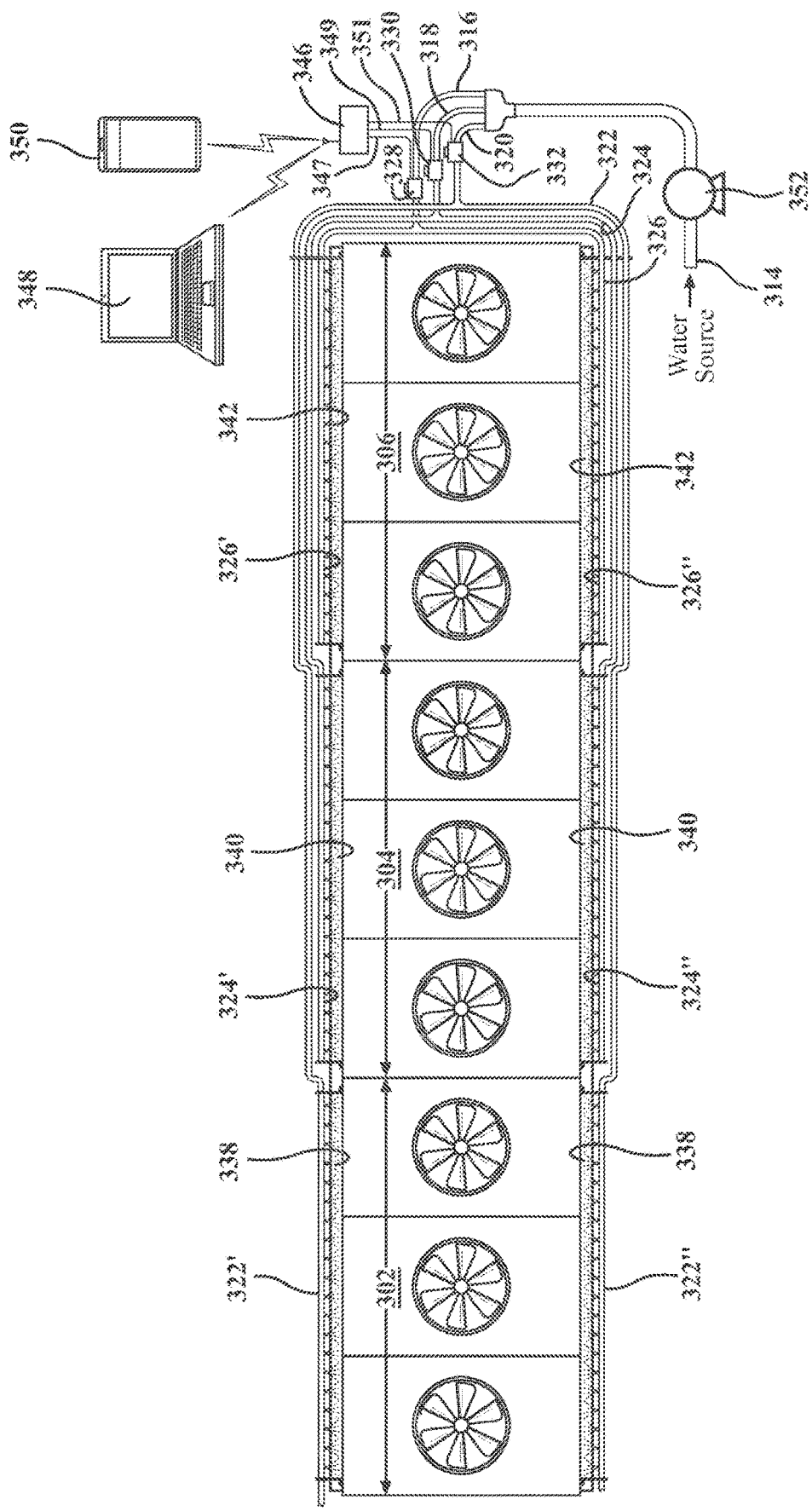
FIG. 22 is a similar illustration to FIG. 21 which depicts any of an analog (manual) or digital controller for activating the individual control valves associated with each filter zone.

FIG. 22 provides a similar illustration to FIG. 21, with common features being repetitively numbered, and which further depicts any of an analog (manual) or digital controller, shown at 346, for providing any times or scheduled activating of the individual control valves 328, 330 and 332 associated with each filter zone 302, 304 and 306. Also depicted is any of a PC/laptop 348 or mobile device 350 which can operate via any of WiFi, Bluetooth® or Near Field Communication protocols for interfacing with the controller 346, which in turn is connected to each of the control valves (see as referenced by wires 347, 349, 351) in order to selectively activate or deactivate each of the control valves 328, 330, 332 controlling operation of the subject spray conduits 322'/322", 324'/324" and 326'/326" corresponding to the opposite side facing filters 338, 340, 342 of the designated filter zones 302, 304, 306.

Also depicted is a pump 352 which can be utilized for supplying and recirculating fluid to the fluid delivery network associated with the given air movement application. As will be described in future embodiments, suitable filtration and make-up fluid capabilities can be incorporated into the present assemblies.

Figure 23:
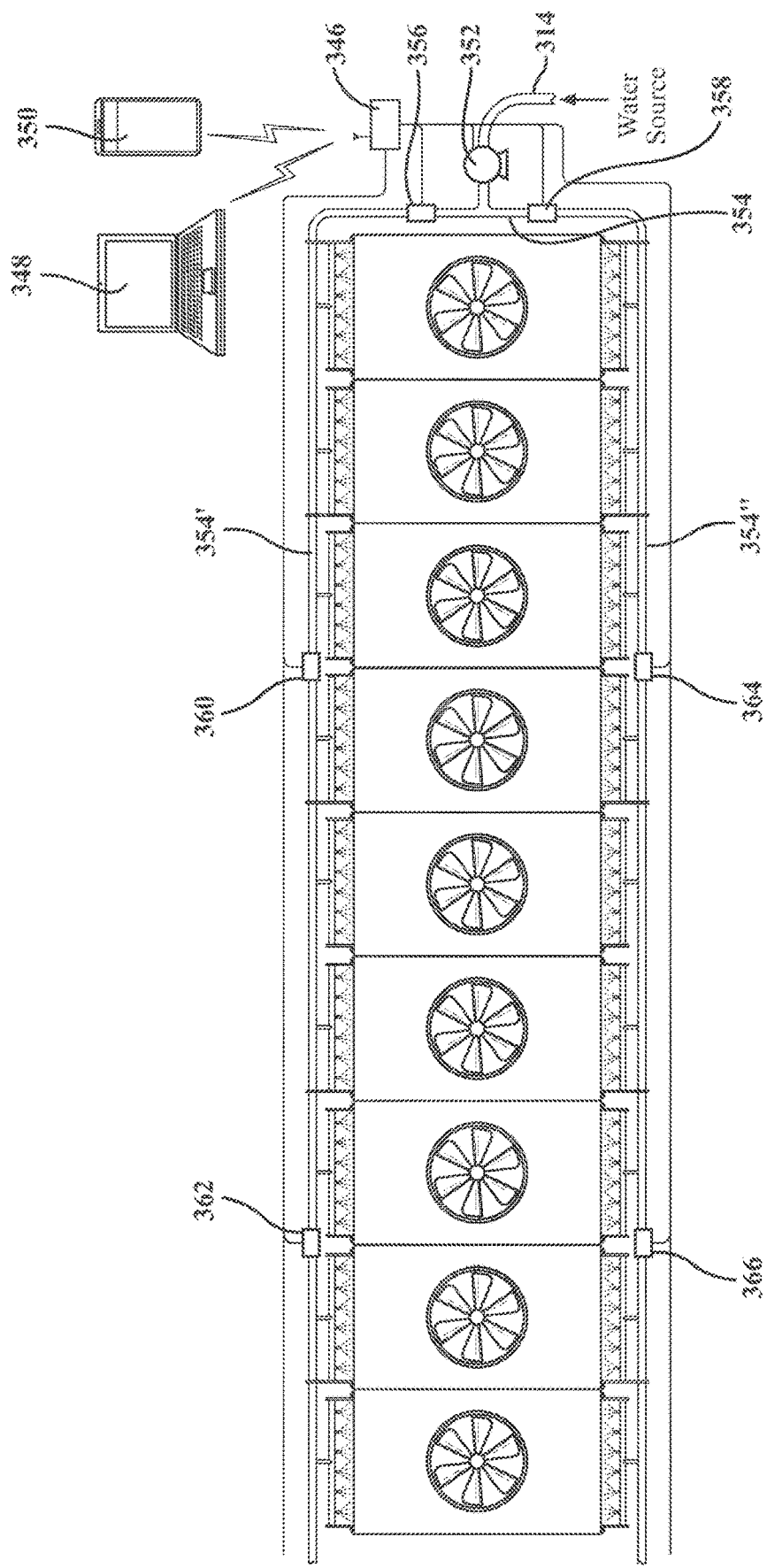
FIG. 23 presents an overhead view of a cooling tower similar to FIG. 22 and further depicting a reconfiguration of the fluid feed lines integrated into single lines extending along each of the first and second sides of the cooling tower, with the control valves being arranged along the lines in order to sequentially activate spray wash along dedicated zones in a timed fashion.

Referring now to FIG. 23, an overhead view is shown of a cooling tower similar to that shown in FIG. 22 and further depicting a reconfiguration of the inlet fluid feed line 314 into a single line 354 which branches into opposite sides of the cooling tower with first 356 and second 358 control valves controlling the branches 354'/354" extending along each of the first and second sides of the cooling tower. Additional to the initial pair of control valves 356/358, other control valves are shown at 360/362 and 364/366 and which are arranged in series along the fluid branches 354'/354" in order to be sequentially activated via the controller 346 (such as along any of a wired configuration as shown or using a wireless communication protocol) to spray wash along each of the dedicated zones in a timed fashion.

Figure 24:
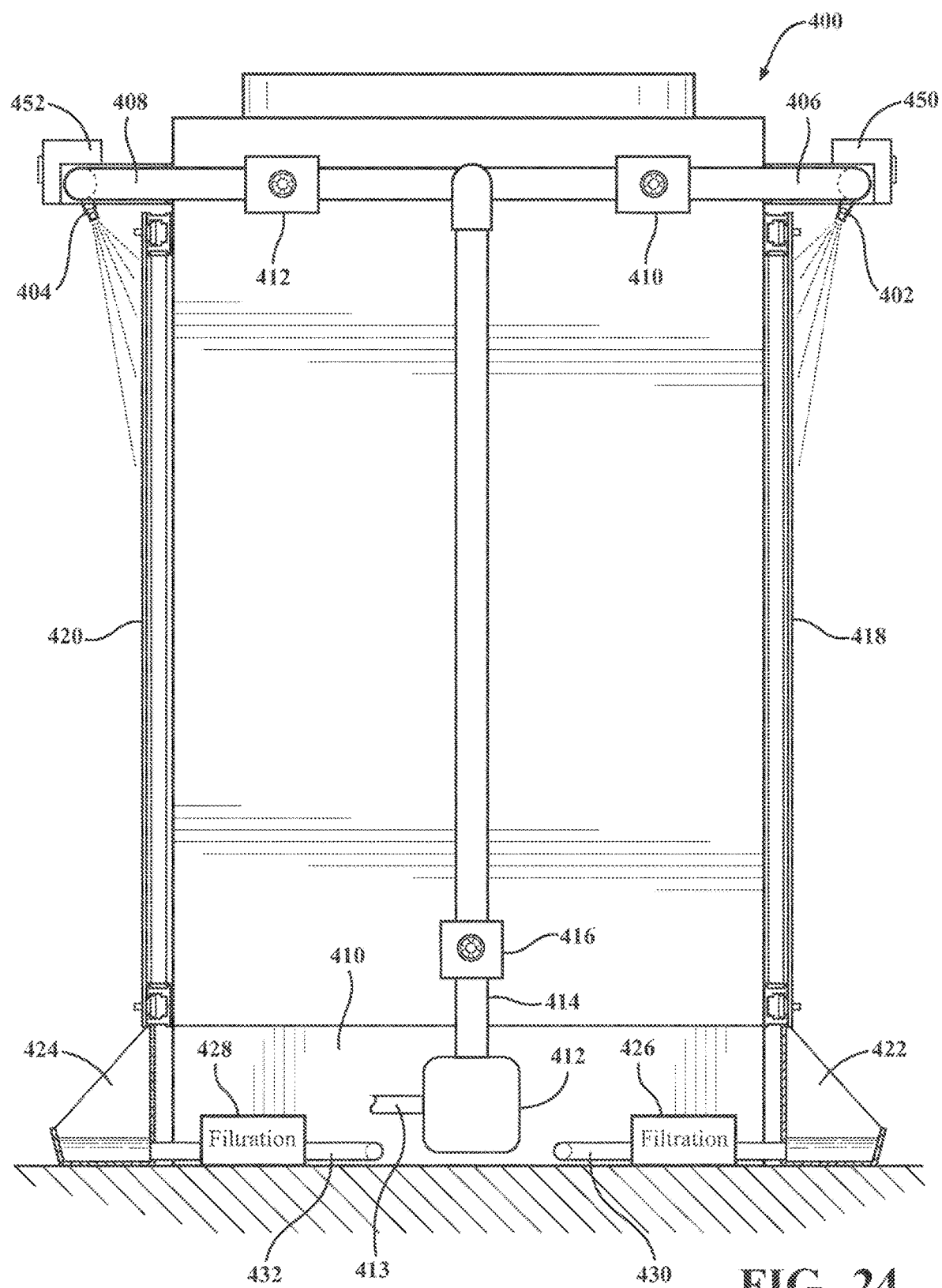
FIG. 24 presents a side view of a cooling tower assembly in which fixed or adjustable nozzles can be integrated into the elevated fluid feed lines in combination with a fluid reservoir collection or basin incorporated into a base of the tower for providing filtration and resupply to the feed lines.

Proceeding to FIG. 24, presented generally at 400 is a side view of a related cooling tower assembly in which fixed or adjustable nozzles, see at 402 and 404, can be integrated into the elevated fluid feed lines 406 and 408 in combination with a fluid collection reservoir or basin 410 incorporated into a base of the tower for providing filtration and resupply to the feed lines. As further shown, the reservoir collection and fluid resupply structure shown can be provided as a closed loop (green) arrangement for filtering and reusing the water/fluid for repetitive filter wash operations. As will be further described, a separate makeup water supply can be provided for replacing loss of a portion of the sprayed fluid resulting from the evaporative effect of the cooling tower.

As further shown, a pump 412 located in or drawing from a clean water reservoir, which redirects the previously collected fluid through a return line 414 with control valve 416 (this corresponding to the main supply line in FIGS. 21-23) for delivery to the branched fluid conduits 406/408, these further including respective control valves 410/412 for delivery to the respective fluid nozzles 402/404 and spray washing of the corresponding filters 418/420. Also representatively shown at 413 is a fluid return line connected to inline or secondary filter components (see at 426/428 including pump 412) and fluid basin 410 delivery mechanism or other clean water reservoir. In a typical cooling operation, the fluid makeup source is responsive to inherent fluid losses resulting from the evaporative effect of the cooling tower in operation. Operation of the makeup source can be manual or can include a fluid reservoir sensor and timer arrangement for introducing measured volumes of fluid into the closed fluid delivery system.

As further shown, the dirty fluid downwardly washes along the filter screens prior to being collected within underneath located troughs (see at 422 and 424) for delivery to filtration components/pumps 426/428 incorporated in to fluid collection lines 430/432 extending into the basin/reservoir 410, and upon which is supported the cooling tower. Upon being filtered, the resupply tube 414 and pump 412 upwardly draws the filtered and iteratively replenished fluid for redelivery through the spray conduits.

Figure 25:
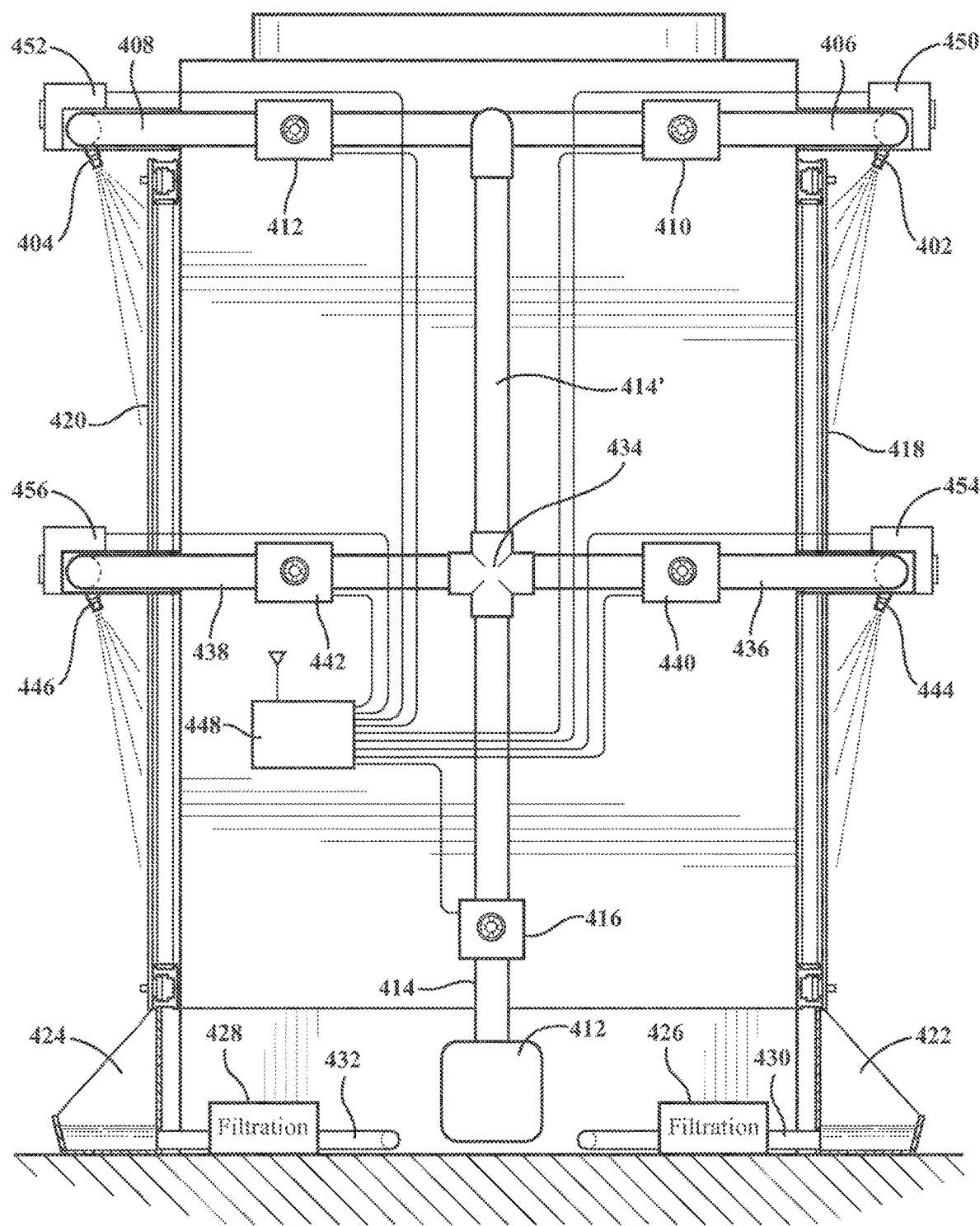
FIG. 25 is a similar view to FIG. 24 and depicting each of a second middle fluid feed line in combination with an upper extending feed line, along with a processor/controller for providing timed or sequential operation of each of multiple filter zones arranged on either side of the cooling tower.

FIG. 25 provides a similar view to FIG. 24 and depicting each of a second middle fluid feed line, this depicted by four way fitting 434 separating fluid return line to lower section 414 and upper section 414' along with subset middle fluid feed lines 436 and 438 with control valves 440/442 for delivery of fluid to intermediate height extending nozzles 444/446 extending below the upper arrayed nozzles 402/404 incorporated into the upper extending feed lines 406/408.

Again depicted is a processor/controller 448 for providing timed or sequential operation of each of multiple filter zones arranged on either side of the cooling tower. As previously shown, this can include any of wireless or dedicated wires extending from the controller 448 to each of the control valves 410, 412, 416, 440, 442, along with additional control valves 450/452 (see also FIG. 24) located in the upper tier nozzle delivery conduits, along with control valves 454/456 integrated into the lower tier nozzle delivery conduits.

Figure 26:
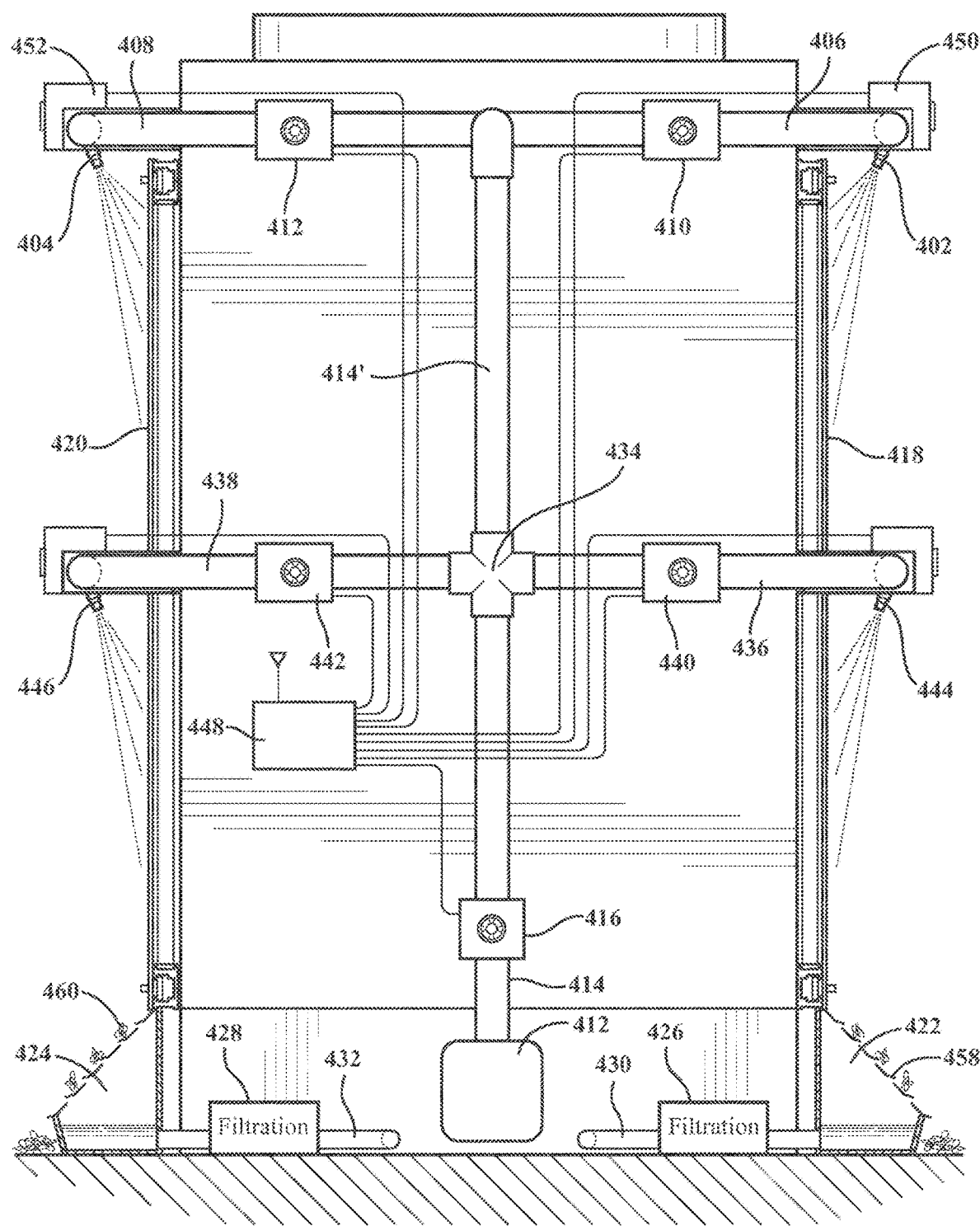
FIG. 26 is similar to FIG. 25 and depicting a covering over the fluid collection basin/reservoir, the same potentially provided by a lower extending skirt portion of the filter secured to the cooling tower.

FIG. 26 is similar to FIG. 25, with repetitive features being identically numbered, and further depicting a covering 458/460 over the fluid collection troughs for the basin/reservoir, the same potentially also provided by a lower extending or draping skirt portion of the filters 418/420 secured to the cooling tower which can overlay the collection troughs 422/424.

Figure 27:
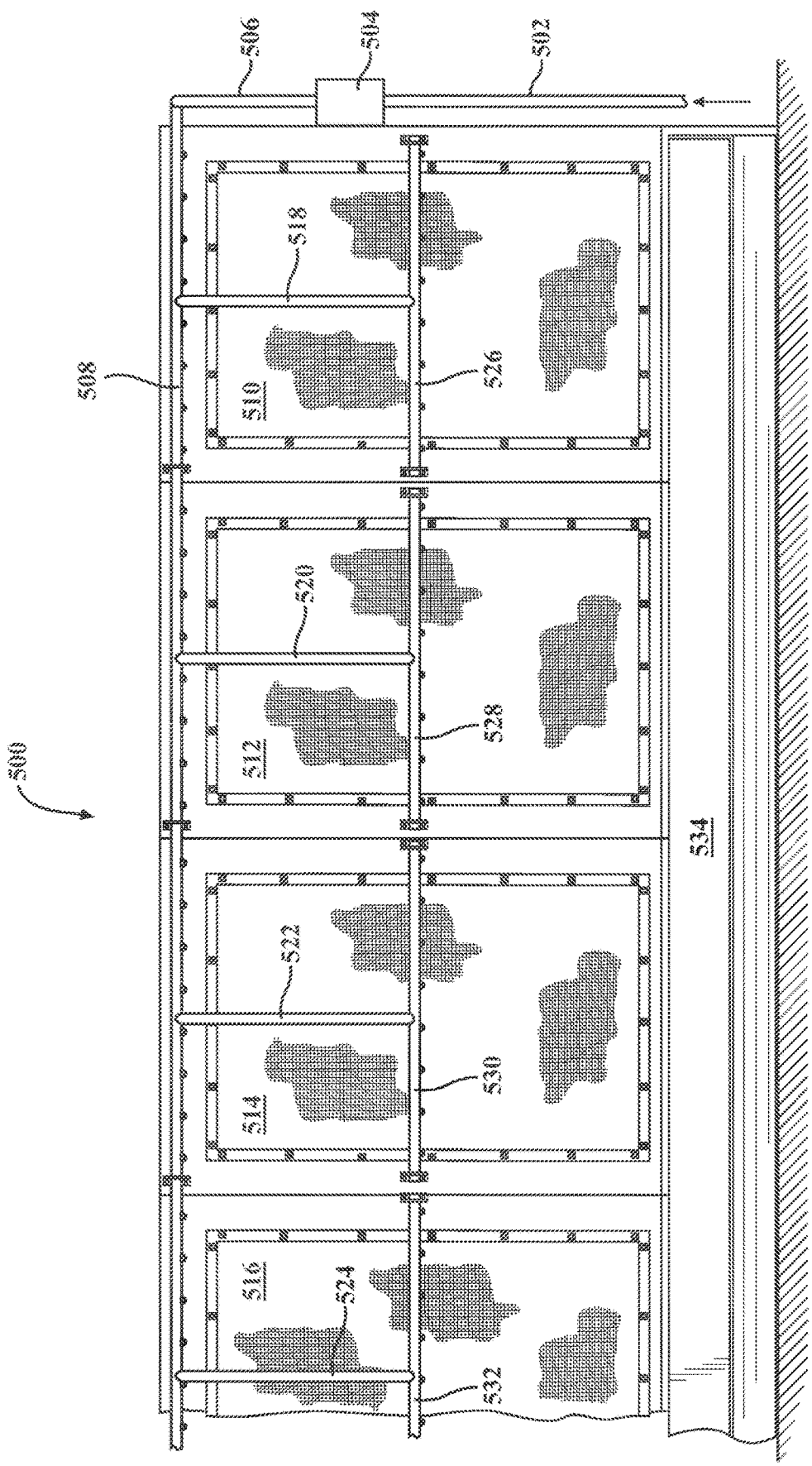
FIG. 27 is a front view of the cooling tower assembly according to a further configuration and depicting a feed pipe arrangement for supplying the middle fluid feed line from the upper arranged feel line.

Finally, FIG. 27 is a front view of the cooling tower assembly, generally at 500, according to a further configuration and depicting a feed pipe arrangement for supplying the middle fluid feed line from the upper arranged feel line. This includes water supply or inlet 502 with an in-line located control valve 504, from which an outlet conduit 506 extending to an upper tower supported fluid spray delivery conduit 508 (a mirroring arranged conduit on an opposite side of the cooling tower not being shown).

Concurrent with the upper conduit 508 delivering nozzle sprayed fluid from the conduit along the individual filter sections (see at 510, 512, 514 and 516), any number of downwardly extending feed pipes (see 518, 520, 522 and 524) branch from the upper conduit for feeding individual and intermediate mounted conduit sections 526, 528, 530 and 532 each mounted in extending fashion across the individual filter sections. Again shown is a collection basin or trough, at 534, which can as previously described also be incorporated into a closed loop system for providing continuous resupply of filtered fluid back to the inlet 502.

As further previously described, any type of processor/controller can be integrated into a smart system, such utilizing an appropriate arrangement of control valves for providing iterative or timed cleaning of the filter screens, this serving to limit the need for filter removal and the attendant use of ladders or other manual lift devices.

In each of the afore-described embodiments, it is again understood that the term "fluid" references interchangeably any gas or liquid such as delivered as a compressed air or water source that fills or pressurizes the supplying tube, pipe or conduit and exits at a high velocity through the various configurations of air or water spray nozzles in order to clear the debris from the surface of the filter screens. This also again integrates an in-line filter that removes suspended particulate from the water or air source before being introduced to the filter cleaner. As previously noted, the embodiments can each also anticipate the inclusion of a mechanical or automated timer that will turn the fluid or electrical source both on and off at given operational intervals. The filter spray cleaning assembly can also be piped to clean a single filter or piped in an array to enable cleaning of multiple filter screens at the same time or can be valve activated to individual openings.

Within the scope of the afore-teachings the mounting bracket designs disclosed anticipate the use of any bracketing system which attaches the filter cleaner directly to the air intake structure (including again without limitation any type of HVAC/Cooling Tower Unit) and permits the adjustment of a filter screen angle and distance from the mounted filter screens. As again noted in the several views, this includes, but is not limited to, articulating brackets (FIG. 4) or semi-circular arcuate adjustment brackets (FIG. 5) that let the filter cleaner move in an outward movement, thus changing distance as it moves in a half-moon direction.

Other embodiments again integrate the ability to traverse the filter cleaner up and down using a simple pulley system which permits the filter cleaner to be raised up and down by pulling on a rope which directly attaches to at least one location on the pipe portion of the filter cleaner. As will be further described, this embodiment anticipates two approaches: one with guide cable/rope, as well as a rope (including a top and bottom pulleys with a looped cable and cleaner affixed to the cable for traversing up and down.

Additional disclosed embodiments again include any suitable version of a channel track which mounts to the exterior air intake structure (HVAC Equipment/Cooling Tower) and for purposes of traversing the filter cleaner along the track while maintaining controlled movement of the filter cleaner up and down or from side to side. Each end of the filter cleaner supply tube in this variant would engage the track via such as uniquely configured roller hooks or other such interface, and which holds the filter cleaner attached to the track during movement.

In addition to the attached methods for a filter cleaner, the present invention also anticipates any lightweight handheld/fixed or telescoping filter cleaner (see again as previously described in FIGS. 6-7) also working with water or compressed air and attached to the nipple output of the filter cleaner staff component (see FIG. 6). Additionally, the adjustable versions of the filter cleaner can also include, in a simplest manifestation, the attachment to a suitable fluid spray conduit of any type of rope or lanyard, which can be provided without any additional supporting structure for effectively displacing the conduit across the face of the filter in a cleaning operation.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A system for cleaning a filter mounted over an intake opening of an air handling unit, comprising:
   a conduit adapted to be secured to an elevated location of the unit, said conduit including a plurality of spaced nozzles arrayed against the filter;
   said nozzles being directed at a downward angle relative to either of a horizontal or vertical side edge of the filter, said conduit with said nozzles being either fixed or angularly adjustable, an arcuate pathway configured in each of opposite end supporting plates between which said conduit extends for adjusting an orientation and angle of said conduit and spaced nozzles;

a fluid source communicated to a supply tube connected to said conduit; and at least one control valve incorporated into said supply tube or conduit for supplying a pressurized fluid through said nozzles in order to provide timed removal of debris from an exterior of the mounted filter.

2. The filter cleaning system of claim 1, further comprising a pump incorporated into said supply tube for pressurizing the fluid.

3. The filter cleaning system of claim 1, further comprising a filter incorporated into said supply tube for filtering said pressurized fluid prior to delivery to said conduit.

4. The filter cleaning system of claim 1, further comprising a controller communicating with said control valves for activating one or more individual filtration sections.

5. The filter cleaning system of claim 4, further comprising at least one of a PC or mobile device for remote operation of said controller.

6. The filter cleaning system of claim 4, said conduit further comprising a plurality of individual conduit sections branching from said fluid source and extending to said individual filtration sections.

7. The filter cleaning system of claim 1, further comprising a fluid collection reservoir adapted to support the air handling unit, said supply tube extending from said reservoir to said conduit.

8. The filter cleaning system of claim 7, further comprising a make-up water supply communicating with said supply tube for compensating for fluid losses resulting from operation of the air handling unit.

9. The filter cleaning system of claim 1, further comprising a second conduit connected to said supply tube and extending from an intermediate location of the air handling unit including a further plurality of spaced nozzles arrayed against a further location of the filter.

10. The filter cleaning system of claim 9, further comprising at least one feed pipe extending between said first and second conduits.

11. The filter cleaning system of claim 1, further comprising a portable air compressor attached to said supply tube for supplying said pressurized fluid as a compressed airflow through said nozzles.

12. The filter cleaning system of claim 1, said conduit further comprising multiple spray issuing conduits adapted to be secured to spaced apart locations of the air handling unit, said supply tube further including multiple branching portions extending to each of said conduits.

13. A cleaning and fluid recirculation system for a filter mounted over an intake opening of an air handling unit, comprising:

a fluid collection basin upon which is adapted to being supported the air handling unit;

a pump supported within said basin and connecting to a fluid supply line with control valve for supplying fluid to elevated feed lines connected to one or more conduits adapted to be secured to elevated locations of the unit, said conduits each including a plurality of spaced nozzles arrayed against the filter; said nozzles being directed at a downward angle relative to either of a horizontal or vertical side edge of the filter, said conduit with said nozzles being either fixed or angularly adjustable, an arcuate pathway configured in each of opposite end supporting plates between which said conduit extends for adjusting an orientation and angle of said conduit and spaced nozzles; and at least one control valve incorporated into any of said fluid supply line, feed lines or conduits for supplying a pressurized fluid through said nozzles in order to provide timed removal of debris from an exterior of the mounted filter prior to collection and recirculation from said basin.

14. The cleaning and fluid recirculation system of claim 13, further comprising a controller communicating with said control valves for activating one or more individual filtration sections.

15. The cleaning and fluid recirculation system of claim 14, further comprising at least one of a PC or mobile device for remote operation of said controller.

16. The cleaning and fluid recirculation system of claim 13, said fluid collection basin further comprising troughs for collecting dirty fluid downwardly washing along the filter screens, filtration pumps located within said basin for filtering said fluid prior to recirculation through said fluid supply line.

17. The cleaning and fluid recirculation system of claim 13, further comprising a makeup water supply communicating to said fluid collection basin for replacing loss of a portion of the recirculated fluid resulting from the evaporative effect of the air handling unit.

* * * * *